(12) United States Patent
Tsubata

(10) Patent No.: US 8,107,032 B2
(45) Date of Patent: Jan. 31, 2012

(54) ACTIVE MATRIX SUBSTRATE AND DISPLAY DEVICE HAVING THE SAME

(75) Inventor: Toshihide Tsubata, Tsu (JP)

(73) Assignee: Sharp Kabushiki Kaisha, Osaka (JP)

( * ) Notice: Subject to any disclaimer, the term of this patent is extended or adjusted under 35 U.S.C. 154(b) by 459 days.

(21) Appl. No.: 12/311,968

(22) PCT Filed: Jun. 15, 2007

(86) PCT No.: PCT/JP2007/062113

§ 371 (c)(1),
(2), (4) Date: Apr. 21, 2009

(87) PCT Pub. No.: WO2008/053612

PCT Pub. Date: May 8, 2008

(65) Prior Publication Data

US 2010/0026921 A1    Feb. 4, 2010

(30) Foreign Application Priority Data

Nov. 2, 2006   (JP) .................................. 2006-298440

(51) Int. Cl.
*G02F 1/1343*    (2006.01)
*G02F 1/136*    (2006.01)

(52) U.S. Cl. ............... 349/48; 349/38; 349/39; 345/87; 345/92; 345/94

(58) Field of Classification Search ............. 349/38–39, 349/48; 345/87, 92, 94
See application file for complete search history.

(56) References Cited

U.S. PATENT DOCUMENTS

| 4,488,150 A |     | 12/1984 | Kanatani |
|---|---|---|---|
| 6,046,790 A | * | 4/2000 | Hara et al. ..................... 349/172 |
| 6,473,077 B1 |   | 10/2002 | Takenaka et al. |
| 6,642,916 B1 |   | 11/2003 | Kodama et al. |

(Continued)

FOREIGN PATENT DOCUMENTS

CN    1437175    8/2003

(Continued)

OTHER PUBLICATIONS

Extended European Search Report dated Nov. 5, 2010.

(Continued)

*Primary Examiner* — Nathanael R Briggs
(74) *Attorney, Agent, or Firm* — Harness, Dickey & Pierce, P.L.C.

(57) ABSTRACT

In one embodiment of the present invention, a display device is enabled to make the display impulse and to improve the charging characteristics of pixel capacities while suppressing the complexity of a drive circuit or the like and the increase in the operating frequency. In an active matrix substrate of a liquid crystal display device, each pixel electrode is connected through a pixel TFT with a source line and through a discharging TFT with a holding capacity line. For one frame period, a liquid crystal capacity, as established by the pixel electrode corresponding to each display line and a common electrode, is charged, when the pixel TFT is turned ON by a pixel scanning signal on a pixel gate line, and is then discharged when the discharging TFT is turned ON by a discharging scanning signal on a discharging gate line. The source line is subjected to a 2-H dot inverse drive but to a charge share for every horizontal periods.

21 Claims, 15 Drawing Sheets

U.S. PATENT DOCUMENTS

| | | |
|---|---|---|
| 6,937,224 B1 | 8/2005 | Miyachi |
| 2002/0047818 A1 | 4/2002 | Yamamoto et al. |
| 2002/0118154 A1 | 8/2002 | Kim |
| 2003/0058229 A1 | 3/2003 | Kawabe et al. |
| 2003/0090449 A1 | 5/2003 | Arimoto et al. |
| 2003/0151572 A1 | 8/2003 | Kumada et al. |
| 2004/0017344 A1 | 1/2004 | Takemoto |
| 2004/0104881 A1 | 6/2004 | Furuya |
| 2004/0109119 A1 | 6/2004 | Lee |
| 2004/0217931 A1 | 11/2004 | Shin |
| 2005/0017935 A1 | 1/2005 | Hirama |
| 2005/0151714 A1 | 7/2005 | Hirama |
| 2005/0219196 A1 | 10/2005 | Lee |
| 2005/0264508 A1 | 12/2005 | Nakamura et al. |
| 2006/0001628 A1 | 1/2006 | Kawaguchi |
| 2006/0050043 A1 | 3/2006 | Kawagoe |
| 2006/0061540 A1 | 3/2006 | Harada |
| 2006/0262071 A1 | 11/2006 | Shieh et al. |
| 2007/0030230 A1 | 2/2007 | Lee |

FOREIGN PATENT DOCUMENTS

| | | |
|---|---|---|
| CN | 1504817 | 6/2004 |
| CN | 1705006 | 12/2005 |
| EP | 1 235 199 | 8/2002 |
| GB | 2 429 569 | 2/2007 |
| JP | 04-309995 | 11/1992 |
| JP | 05-119346 | 5/1993 |
| JP | 09-243998 | 9/1997 |
| JP | 11-30975 | 2/1999 |
| JP | 11-326957 | 11/1999 |
| JP | 11-352462 | 12/1999 |
| JP | 2000-122596 | 4/2000 |
| JP | 2000-148098 | 5/2000 |
| JP | 2001-60078 | 3/2001 |
| JP | 3211256 | 7/2001 |
| JP | 2001-331156 | 11/2001 |
| JP | 2002-62855 | 2/2002 |
| JP | 2002-268613 | 9/2002 |
| JP | 2002-328654 | 11/2002 |
| JP | 2003-66918 | 3/2003 |
| JP | 2003-255912 | 9/2003 |
| JP | 2003-255912 | 10/2003 |
| JP | 2003-302951 | 10/2003 |
| JP | 2004-61590 | 2/2004 |
| JP | 2004-279626 | 10/2004 |
| JP | 2004-334171 | 11/2004 |
| JP | 2005-12911 | 5/2005 |
| JP | 2005-201974 | 7/2005 |
| JP | 2006-72078 | 3/2006 |
| JP | 2007-41548 | 2/2007 |
| WO | WO 03/091790 | 11/2003 |

OTHER PUBLICATIONS

Supplementary European Search Report dated Dec. 13, 2010 for corresponding European Patent Application.

Supplementary European Search Report dated Dec. 23, 2010 for corresponding European Patent Application.

Office Action by the Japanese Patent Office dated May 31, 2011 for corresponding Japanese Patent Application JP 61-228491 with machine translation.

* cited by examiner

ACTIVE MATRIX SUBSTRATE AND DISPLAY DEVICE HAVING THE SAME

TECHNICAL FIELD

The present invention relates to an active matrix substrate using switching elements such as thin film transistors, and an active matrix-type display device such as a liquid crystal display device provided with the active matrix substrate.

BACKGROUND ART

An active matrix substrate is widely used in an active matrix-type display device such as a liquid crystal display device and an EL (Electroluminescence) display device. For example, the main part of the active matrix-type liquid crystal display device is composed of a liquid crystal panel and drive circuits thereof, and the liquid crystal panel typically includes: the active matrix substrate having pixel circuits arranged in a matrix, each of which contains a thin film transistors (hereinafter, simply abbreviated as "TFT") as a switching element and a pixel electrode and the like; an opposite substrate of a transparent insulating substrate such as a glass plate having an opposite electrode and an alignment film which are sequentially deposited over the entire surface thereof; a liquid crystal layer sandwiched between the both substrates; and polarizer plates attached to the outside surfaces of the both substrates, respectively.

FIG. 23 is a plan view showing a structure of a conventional active matrix substrate 700 used for the liquid crystal display device as described above, and illustrates a pattern configuration in a part corresponding to one pixel. The active matrix substrate 700 includes a plurality of data signal lines 715, a plurality of scanning signal lines 716 intersecting the plurality of data signal lines 715, TFTs 712 as the switching elements, which are formed in the neighborhoods of the intersections of the plurality of data signal lines 715 and the plurality of scanning signal lines 716, respectively, and pixel electrodes 717. The scanning signal line 716 works also as a gate electrode of the TFT 712, a source electrode 719 of the TFT 712 is connected to the data signal line 715, and a drain electrode 708 thereof is connected to the pixel electrode 717 via a drain extraction electrode 707. A hole is formed in an insulating film disposed between the drain extraction electrode 707 and the pixel electrode 717 and thereby a contact hole 710 is formed connecting the drain extraction electrode 707 and the pixel electrode 717. The pixel electrode 717 is a transparent electrode made of ITO (Indium Tin Oxide) or the like and transmits light from the back of a liquid crystal panel including the active matrix substrate 700 (light from a backlight).

In the active matrix substrate 700, the TFT 712 is turned on by a gate-on voltage of a scanning signal applied to the scanning signal line 716 (conductive state between the source electrode 719 and the drain electrode 708), a data signal applied to the data signal line 715 in this state is written into a pixel capacitance (capacitance formed by the pixel electrode 717 and the opposite electrode) via the source electrode 719, the drain electrode 708, and the drain extraction electrode 707. Note that, in this active matrix substrate 700, a storage capacitance line 718 is formed along the scanning signal line 716 and this storage capacitance line 718 has a function for avoiding self discharge of the liquid crystal layer during an OFF period in the TFT 712, and the like.

Meanwhile, in an impulse type display device such as a CRT (Cathode Ray Tube), when focusing on each pixel, an ON period when an image is displayed and an OFF period when an image is not displayed are repeated alternately. For example, when a moving image is displayed, the OFF period is inserted when an image of one screen is rewritten and a residual image of a moving object is not produced in human visual sense. Thereby, the object and the background thereof can be distinguished clearly and the moving image can be viewed without uncomfortable feeling.

On the other hand, in a hold type display device such as the liquid crystal display device using the active matrix substrate as described above, luminance of each pixel is determined by a voltage retained in its pixel capacitance, and the retained voltage in each of the pixel capacitances is maintained during one frame period, once rewritten. In such a hold type display device, the voltage to be retained in the pixel capacitance as pixel data is retained, once written, until the pixel capacitance is rewritten next, and thereby the image in each frame is temporally close to the image one frame prior thereto. This produces the residual image of the moving object in the human visual sense when the moving image is displayed. For example, as shown in FIG. 22, a residual image AI is produced as an image OI representing a moving object is dragging a tail (hereinafter, called "tail-dragging residual image").

Since such a tail-dragging residual image is produced in the moving image display of the hold type display device such as the active matrix-type liquid crystal display device or the like, conventionally the impulse type display device has been employed typically for a display such as a television or the like which mainly displays the moving image. However, the display such as the television or the like recently has been required strongly to have a lighter weight and a slimmer body and the hold type display device such as the liquid crystal display device which is easily to have the lighter weight and the slimmer body has been employed rapidly for such a display.

Patent document 1: Japanese Patent Application Laid-Open No. H4-309995
Patent document 2: Japanese Patent Application Laid-Open No. H5-119346
Patent document 3: Japanese Patent Application Laid-Open No. 2003-255912
Patent document 4: Japanese Patent Application Laid-Open No. 2003-66918
Patent document 5: Japanese Patent Application Laid-Open No. H9-243998
Patent document 6: Japanese Patent Application Laid-Open No. 2004-61590

DISCLOSURE OF THE INVENTION

Problems to be Solved by the Invention

As a method for improving the above tail-dragging residual image in the hold type display device such as the active matrix-type liquid crystal display device or the like, there is known a method to cause the display of the liquid crystal display device to be an (pseudo) impulse type, for example, by inserting a period of black display during one frame period (hereinafter, called "black insertion") (e.g., Patent document 4 (Japanese Patent Application Laid-Open No. 2003-66918, which corresponds to U.S. Pat. No. 7,161,576)). However, when the impulse type is tried to be realized by the conventional method in the active matrix-type liquid crystal display device which is the hold type display device, a drive circuit and the like becomes complicated for the black insertion, and also an operating frequency of the drive circuit increases and a time to be secured for charging the pixel capacitance becomes shorter.

For solving such problems, there has been proposed a configuration of the active matrix substrate in the liquid crystal display device or the like to provide two switching elements for each pixel formation portion and to provide a second signal line separately for transmitting black data in addition to a first signal line for transmitting pixel data to the pixel formation portion (e.g., Patent document 3 (Japanese Patent Application Laid-Open No. 2003-255912)). However, in such a configuration, not only a structure of the active matrix substrate becomes complicated, but also a power supply is required for a signal applied to the second signal line for the black display, resulting in a more complicated drive circuit and increased power consumption.

Further, the active matrix-type liquid crystal display device has been improved recently in a resolution thereof, and there is a trend that a shorter charging time can be secured for writing the pixel data into the pixel capacitance. When the charging time becomes shorter, there arises a problem that right pixel data cannot be written into the pixel capacitance because of charging shortage.

Meanwhile, in the liquid crystal display device using a dot inversion drive method which inverts a polarity of the data signal every two horizontal periods (hereinafter, called "2H dot inversion drive method"), there is a case of employing a charge sharing method to short between neighboring data signal lines in the polarity inversion of the data signal for reducing power consumption (e.g., Patent document 5 (Japanese Patent Application Laid-Open No. H9-243998)). In this case, the charge amount of the pixel capacitance may be different between the two lines of a polarity inversion unit and sometimes a horizontal irregularity is viewed in a line. On the other hand, there is proposed a method to make the charging characteristic uniform by setting the data signal to exhibit a certain intermediate potential between a positive polarity and a negative polarity in a blanking period every one horizontal period (Patent document 6 (Japanese Patent Application Laid-Open Publication No. 2004-61590, which corresponds to US Patent Application No. 2004/0017344)).

However, when it becomes difficult to secure a sufficient charging time or a sufficient charge sharing period because of the progress in the higher resolution or the operating frequency increase for the impulse type drive, even application of such a method cannot satisfactorily eliminates the charge amount difference in the pixel capacitance between the above two lines of the polarity inversion unit and there remains a possibility that the line shape horizontal irregularity is viewed. Further, when each data signal line potential does not reach a source center potential or a common potential because a sufficient charge sharing period cannot be secured, this also becomes a factor to worsen the charging shortage. Such a point, that the charging shortage becomes a more serious problem as the resolution improvement or the operating frequency increase, is similar for the liquid crystal display device using a 1H dot inversion drive method.

Meanwhile, Patent document 2 (Japanese Patent Application Laid-Open No. H5-119346) discloses the liquid crystal display device, which is the active matrix-type liquid crystal display device having an auxiliary capacitance electrode extended under the pixel electrode, and includes an auxiliary switching element which has a source connected to the pixel electrode, a gate connected to a gate line (scanning signal line) of the previous stage, and a drain connected to the auxiliary capacitance electrode, wherein the pixel electrode is configured to be charged up to a potential of the auxiliary capacitance electrode (common potential) by a gate signal (scanning signal) of the gate line in the previous stage. This configuration can suppress the charging shortage of the pixel capacitance caused by the increase in the pixel numbers, since the pixel electrode is charged up to the common potential via the auxiliary switching element before the pixel electrode is charged up to a target potential (potential corresponding to a pixel value of a display image). However, the patent publication does not disclose anything about the impulse type display, for example, for eliminating the tail-dragging residual image in the moving image display. Further, in the configuration disclosed in the publication, the pixel electrode is charged up to the common potential via the auxiliary switching element immediately (at most approximately one horizontal period) before the charge up to the target potential of the pixel electrode, and thereby the auxiliary switching element cannot be utilized for the impulse type display.

Accordingly, an object of the present invention is to provide an active matrix substrate and a display device having the same, which can realize the impulse type display while suppressing the complication of the drive circuit or the increase in the operating frequency, and also improve the charging characteristic of the pixel capacitance.

Means for Solving the Problems

A first aspect of the present invention provides an active matrix substrate including:
a plurality of data signal lines;
a plurality of pixel scanning signal lines intersecting the plurality of data signal lines;
a pixel switching element provided corresponding to each of intersections of the plurality of data signal lines and the plurality of pixel scanning signal lines, and turned on and off by the pixel scanning signal line, passing through the corresponding intersection;
a pixel electrode connected to the data signal line passing through the intersection corresponding to the pixel switching element via the pixel switching element;
a storage capacitance line disposed so as to form a predetermined capacitance with each of the pixel electrodes;
a plurality of discharge scanning signal lines corresponding to the plurality of pixel scanning signal lines, respectively; and
a discharge switching element provided corresponding to each of the pixel electrodes, and turned on and off by the discharge scanning signal line which corresponds to the pixel scanning signal line for turning on and off the pixel switching element connected to the corresponding pixel electrode,
each of the pixel electrodes being connected to the storage capacitance line via the corresponding discharge switching element.

A second aspect of the present invention provides the active matrix substrate according to the first aspect of the present invention, wherein;
the storage capacitance line has an extended portion extending in a direction along the data signal line; and
the discharge switching element is a thin film transistor having a drain electrode and a source electrode,
the drain electrode being connected to the pixel electrode corresponding to the discharge switching element, and
the source electrode being connected to the extended portion via a predetermined source extraction electrode.

A third aspect of the present invention provides the active matrix substrate according to the second aspect of the present invention, wherein the extended portion and the source extraction electrode form a structure disposed circularly along an edge of the pixel electrode.

A fourth aspect of the present invention provides the active matrix substrate according to the second aspect of the present invention, wherein an electrode connected to the source and an electrode connected to the drain of the thin film transistor as the discharge switching element are formed of the same material as that of the data signal line.

A fifth aspect of the present invention provides the active matrix substrate according to the first aspect of the present invention, wherein the storage capacitance line has a circular portion including a portion which extends in parallel to the data signal line along an edge of the pixel electrode and a portion which extends in parallel to the pixel scanning signal line along the edge of the pixel electrode.

A sixth aspect of the present invention provides the active matrix substrate according to the first aspect of the present invention, wherein the discharge switching element is disposed so as to overlap an electrode pattern forming the discharge scanning signal line.

A seventh aspect of the present invention provides the active matrix substrate according to the first aspect of the present invention, wherein the pixel electrode is disposed so as to overlap the discharge scanning signal line.

An eighth aspect of the present invention provides a normally black mode display device, including;
an active matrix substrate according to any one of the first to seventh aspects of the present invention;
a common electrode disposed so as to face each of pixel electrodes in the active matrix substrate;
a pixel scanning signal line drive circuit for selectively applying an active signal, which turns on the pixel switching element, to the plurality of pixel scanning signal lines and causing the pixel scanning signal line to which the active signal is applied to be in a selected state such that each of the plurality of pixel scanning signal lines is in the selected state at least once during each frame period;
a discharge scanning signal line drive circuit for selectively applying an active signal, which turns on the discharge switching element, to the plurality of discharge scanning signal lines and causing the discharge scanning signal line to which the active signal is applied to be in a selected state such that each of the plurality of discharge scanning signal lines is in the selected state during a predetermined period within a period from a first time point when the corresponding pixel scanning signal line changes from the selected state to a non-selected state to a second time point when the corresponding pixel scanning signal line is in the selected state in the next frame period;
a data signal line drive circuit for generating a plurality of data signals to display an image as voltage signals whose polarities are inverted every predetermined number of horizontal periods, and applying the plurality of data signals to the plurality of data signal lines, respectively;
a common potential supply section for providing a predetermined common potential to the common electrode; and
a storage capacitance line potential supply section for providing a predetermined potential approximately the same as the common potential to the storage capacitance line.

A ninth aspect of the present invention provides the display device according to the eighth aspect of the present invention, wherein the data signal line drive circuit generates the plurality of data signals so as to invert the voltage polarity thereof every two or more predetermined number of horizontal periods.

A tenth aspect of the present invention provides the display device according to the eighth aspect of the present invention, wherein the data signal line drive circuit
generates the plurality of data signals so as to invert the polarity thereof every predetermined number of the data signal lines, and
cuts off the application of the plurality of data signals to the respective plurality of data signal lines and also shorts the plurality of data signal lines with each other, during a predetermined period when the polarities of the plurality of data signals are inverted.

An eleventh aspect of the present invention provides the display device according to the tenth aspect of the present invention, wherein the data signal line drive circuit cuts off the application of the plurality of data signals to the respective plurality of data signal lines and also shorts the plurality of data signal lines with each other, during a predetermined period every one horizontal period.

A twelfth aspect of the present invention provides the display device according to the eleventh aspect of the present invention, wherein the data signal line drive circuit provides a predetermined fixed potential to the plurality of data signal lines when the plurality of data signal lines are shorted with each other.

A thirteenth aspect of the present invention provides the display device according to the twelfth aspect of the present invention, wherein the fixed potential is equal to the predetermined potential.

A fourteenth aspect of the present invention provides a television receiver, including a display device according to the eighth aspect of the present invention.

A fifteenth aspect of the present invention provides a drive method of a normally black mode display device provided with an active matrix substrate and a common electrode; the active matrix substrate including a plurality of data signal lines, a plurality of pixel scanning signal lines intersecting the plurality of data signal lines, a pixel switching element which is provided corresponding to each of intersections of the plurality of data signal lines and the plurality of pixel scanning signal lines and turned on and off by the pixel scanning signal line passing through the corresponding intersection, a pixel electrode connected to the data signal line passing through the intersection corresponding to the pixel switching element via the pixel switching element, and a storage capacitance line disposed so as to form a predetermined capacitance with the pixel electrode; the common electrode being disposed so as to face each of the pixel electrodes in the active matrix substrate; the drive method including:
a pixel scanning signal line drive step of selectively applying an active signal, which turns on the pixel switching element, to the plurality of pixel scanning signal lines and causing the pixel scanning signal line to which the active signal is applied to be in a selected state such that each of the plurality of pixel scanning signal lines is in the selected state at least once during each frame period;
a data signal line drive step of generating a plurality of data signals to display an image as voltage signals whose polarities are inverted every predetermined number of horizontal periods and applying the plurality of data signals to the plurality of data signal lines, respectively;
a common potential supply step of providing a predetermined common potential to the common electrode;
a storage capacitance line potential supply step of providing a predetermined potential approximately equal to the common potential to the storage capacitance line; and
a discharge step of shorting each of the pixel electrodes to the storage capacitance line, wherein the active matrix substrate further includes:
a plurality of discharge scanning signal lines corresponding to the plurality of pixel scanning signal lines, respectively; and
a discharge switching element provided corresponding to each of the pixel electrodes, and turned on and off by the discharge scanning signal line which corresponds to the pixel scanning signal line for turning on and off the pixel switching element connected to the corresponding pixel electrode,
each of the pixel electrodes is connected to the storage capacitance line via the corresponding discharge switching element, and
in the discharge step, an active signal, which turns on the discharge switching element, is selectively applied to the plurality of discharge scanning signal lines and the discharge scanning signal line to which the active signal is applied is caused to be in a selected state, such that each of the plurality of discharge scanning signal lines is in the selected state during a predetermined period within a period from a first time point when the corresponding pixel scanning signal line changes from the selected state to a non-selected state to a second time point when the corresponding pixel scanning signal line is in the selected state in the next frame period.

Other aspects of the present invention are apparent from the description of the above-described aspects and the following embodiments of the present invention, and thus description thereof is not given.

Advantages of the Invention

According to the first aspect of the present invention, each of the pixel electrodes is connected to the storage capacitance line via the discharge switching element which is turned on and off by the discharge scanning signal line disposed corresponding to each of the pixel scanning signal lines in the active matrix substrate. Accordingly, when the active matrix substrate according to this aspect of the present invention is used in the display device such as the liquid crystal display device, in which the pixel capacitances are charged up to a voltage of image data having a polarity inverted every one frame period, each of the pixel capacitances discharges a charge with the inverse polarity by application of the discharge scanning signal to the discharge scanning signal line before the charge up corresponding to the pixel data writing. Thereby, even when the resolution or the like is increased, the charging shortage is suppressed and the display quality is improved. Further, when the display device uses a normally black mode, a black display period can be inserted for each display line by the application of the discharge scanning signal to each of the discharge scanning signal lines, and thereby the display quality of the moving image can be improved by employing the impulse type display while suppressing the complication of the drive circuit or the increase of the operating frequency.

According to the second aspect of the present invention, the storage capacitance line has the extended portion which extends in parallel to the data signal line, and thereby influence of potential changes in the other electrodes on a pixel electrode potential can be suppressed.

According to the third aspect of the present invention, the extended portion of the storage capacitance line and the source extraction electrode in the thin film transistor as the discharge switching element constitute a structure disposed circularly along the edge of the pixel electrode, and thereby the influence of the potential change in the data signal line, the pixel scanning signal line, or the discharge scanning signal line on the pixel electrode potential can be suppressed.

According to the fourth aspect of the present invention, the electrode connected to the source and the electrode connected to the drain in the thin film transistor of the discharge switching element are formed using the same material as that of the data signal line, and thereby these electrodes can be formed in a data signal line formation process and need not be formed separately.

According to the fifth aspect of the present invention, the storage capacitance line has a portion extending in parallel to the data signal line along the edge of the pixel electrode and a portion extending in parallel to the pixel scanning signal line along the edge of the pixel electrode, and thereby the influence of the potential change in the data signal line or the pixel scanning signal line on the pixel electrode potential can be suppressed. Accordingly, a parasitic capacitance formed by the pixel electrode and the data signal line and a parasitic capacitance formed by the pixel electrode and the pixel scanning signal line can be reduced, thus improving the display quality.

According to the sixth aspect of the present invention, the discharge switching element is disposed so as to overlap the electrode pattern forming the discharge scanning signal line, thus enabling a larger aperture ratio.

According to the seventh aspect of the present invention, it is possible to secure a larger pixel area by disposing the pixel electrode so as to overlap the discharge scanning signal line, thus enabling a larger aperture ratio.

According to the eighth aspect of the present invention, in the normally-black mode display device, the discharge scanning signal line is provided corresponding to each of the pixel scanning signal lines, wherein each of the pixel scanning signal lines enters the selected state at least once every frame period for writing the image data of the image to be displayed, and each of the discharge scanning signal lines enters the selected state during the predetermined period within the period from the first time point when the pixel scanning signal line corresponding thereto changes from the selected state to the non-selected state to the second time point when the pixel scanning signal line changes to the selected state in the next frame period. Thereby, the black display period is inserted every display line, and it becomes possible to realize the impulse type display by suppressing the complication of the drive circuit, etc. and the increase in the operating frequency, resulting in improvement of the display quality of the moving image. When the display device according to this aspect of the present invention is the display device such as the liquid crystal display device, in which the pixel capacitance is charged with the voltage (as image data) having the polarity inverted every one frame period, each of the pixel capacitances discharges the inverse polarity charge by the application of the discharge scanning signal to the discharge scanning signal line before the charge up corresponding to the pixel data writing. That is, in the liquid crystal display device, since the pixel data writing means to charge up the pixel capacitance, which has been charged up by a certain polarity voltage, by the inverse polarity voltage, the discharging of the pixel capacitance for the black insertion also works for the pre-charging. Thereby, it is possible to improve the display quality, since the charging shortage is suppressed even when the resolution and the like is increased.

According to the ninth aspect of the present invention, the inverse polarity charge of the pixel capacitance is discharged for the black insertion before the charge up of the pixel capacitance corresponding to the pixel data writing, and thereby the charging shortage is suppressed in the pixel data writing. Accordingly, while reducing the power consumption of the data signal line drive circuit by inverting the polarity of each of the data signals every two or more predetermined number of horizontal periods, it is possible to prevent the occurrence of the horizontal irregularity by the discharge for the above black insertion.

According to the tenth aspect of the present invention, the data signal is generated as a voltage signal having the polarity inverted every predetermined number of data signal lines, and charge sharing is carried out among the data signal lines by shorting the data signal lines with each other in the active matrix substrate during a predetermined period when the polarity of the data signal is inverted. Thereby, the power consumption of the data signal line drive circuit is reduced and also each of the data signal lines has the intermediate potential before the charge up of the pixel capacitance corresponding to the pixel data writing. By both of such charge sharing operation and the discharge of the charge in the pixel capacitance for the black insertion, the charging shortage of the pixel capacitance is suppressed securely in the pixel data writing, thus improving the display quality.

According to the eleventh aspect of the present invention, the data signal is generated as the voltage signal having the polarity inverted every predetermined number of data signal lines, and the data signal lines are shorted with each other on the active matrix substrate during a predetermined period every one horizontal period. Accordingly, the charge is transferred among the data signal lines every one horizontal period and thereby the charging condition can be made uniform while the charging shortage of the pixel capacitance is suppressed in the pixel data writing, even when the polarity of the data signal is inverted every two or more predetermined number of horizontal periods, thus securely preventing the horizontal irregularity from occurring.

According to the twelfth aspect of the present invention, the fixed potential is applied to the data signal lines when the data signal lines are shorted with each other on the active matrix substrate (charge sharing period), and thereby the potentials become always the same among the data signal lines immediately after the charge sharing period regardless of display gradation. By both of this and the discharge of the pixel capacitance for the black insertion, the charging condition of the pixel capacitance is made uniform in the pixel data writing, and it is possible to securely prevent the horizontal irregularity from occurring when the polarity of the data signal is inverted every two or more predetermined horizontal periods.

According to the thirteenth aspect of the present invention, the fixed potential equal to the storage capacitance line potential is applied to each of the data signal lines during the charge sharing period, and thereby the potential of the pixel electrode forming the pixel capacitance is made equal to the potential of the data signal line to transmit the data signal for charging the pixel capacitance, at a start timing of the pixel capacitance charge up for the pixel data writing. Accordingly, the charging condition can be made the same regardless of whether the polarity of the data signal for charging the pixel capacitance is positive or negative, and thereby it is possible to accurately suppress the generation of the horizontal irregularity when the polarity of the data signal is inverted every two or more predetermined number of horizontal periods. Note that, for the fixed potential, it is possible to use the common potential to be provided to the common electrode or a potential corresponding to a middle value (center value) between the minimum and maximum values of the data signal.

Advantages of the other aspects of the present invention are apparent from the description of the advantages of the above-described aspects and the description of the following embodiments of the present invention, and thus description thereof is not given.

DESCRIPTION OF THE REFERENCE SYMBOLS

Figure 1:
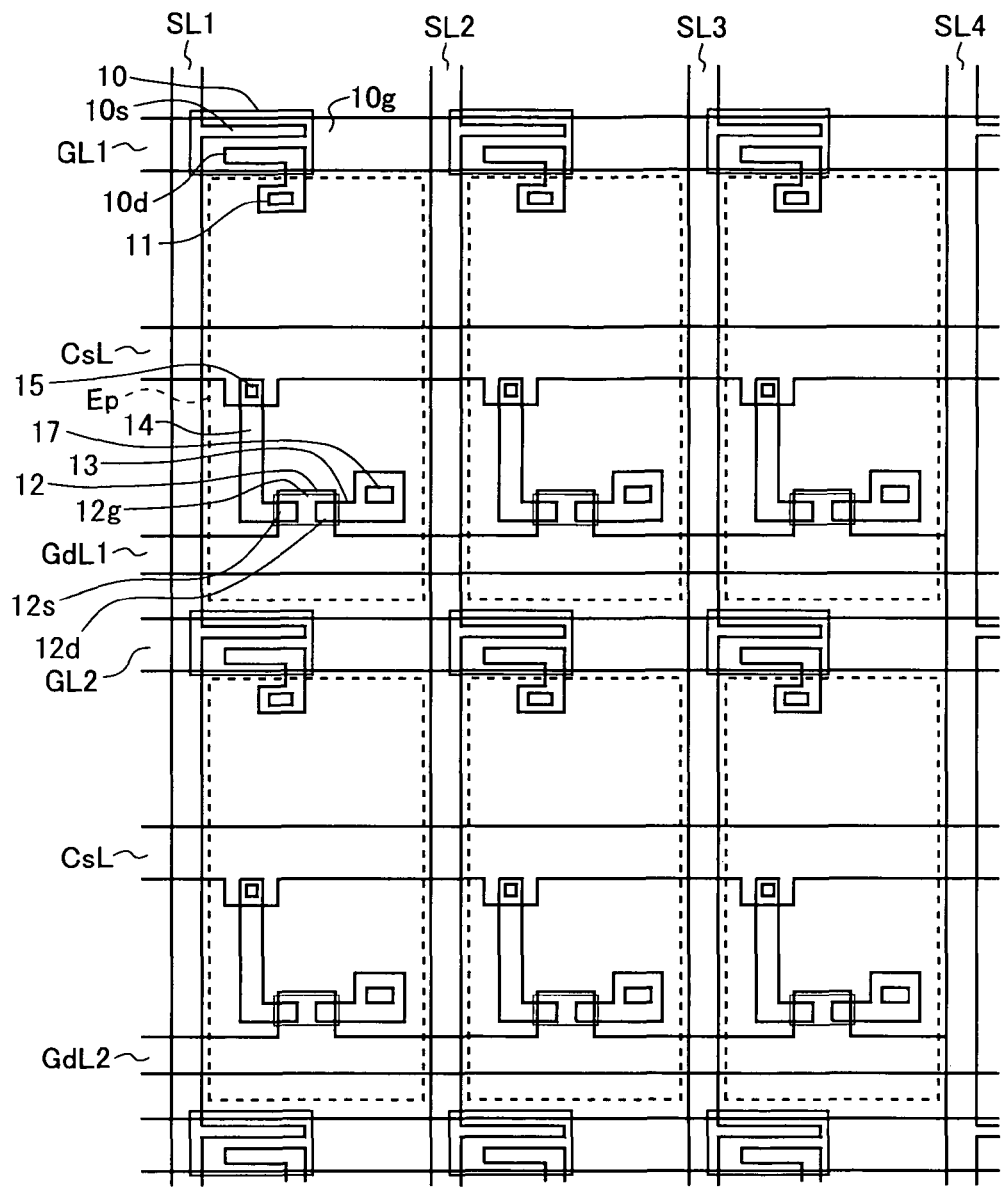
FIG. 1 is a plan view showing a first pattern configuration example for an active matrix substrate in a liquid crystal display device according to a first embodiment of the present invention.

10 Pixel TFT (Pixel switching element)
12 Discharge TFT (Discharge switching element)
12d Drain electrode
12s Source electrode
14 Source extraction electrode
16a-16e Extended portion (of storage capacitance line)
100 Display part
110 Active matrix substrate
120 Opposite substrate
200 Display control circuit
300 Source driver (Data signal line drive circuit)
302 Data signal generation section
304 Output section
410 Pixel gate driver (Pixel scanning signal line drive circuit)
420 Discharge gate driver (Discharge scanning signal line drive circuit)
600 Common electrode/storage capacitance line drive circuit (Common potential supply section, Storage capacitance line potential supply section)
610 Common electrode drive circuit (Common potential supply section)
620 Storage capacitance line drive circuit (Storage, capacitance line potential supply section)
Clc Liquid crystal capacitance
Ccs Storage capacitance
Ep Pixel electrode
Ec Common electrode
SWa First MOS transistor
SWb, SWc Second MOS transistor
SLi Source line (Data signal line) (i=1, 2, . . . , N)
GLj Pixel gate line (Pixel scanning signal line) (j=1, 2, . . . , M)
GdLj Discharge gate line (Discharge scanning signal line) (j=1, 2, . . . , M)
CsL Storage capacitance line
S(i) Data signal (i=1, 2, . . . , N)
G(j) Pixel scanning signal j=1, 2, . . . , M)
Gd(j) Discharge scanning signal (j=1, 2, . . . , M)
Vcom Common potential (Opposite voltage)
VSdc Source center potential (DC level of data signal)
Csh Charge sharing control signal
Pw Pixel data write pulse
Pb Black voltage application pulse
Tsh Charge sharing period

BEST MODES FOR CARRYING OUT THE INVENTION hereinafter, embodiments of the present invention will be described with reference to the accompanying drawings.

1. First Embodiment 1.1. Configuration and Operation

Figure 5:
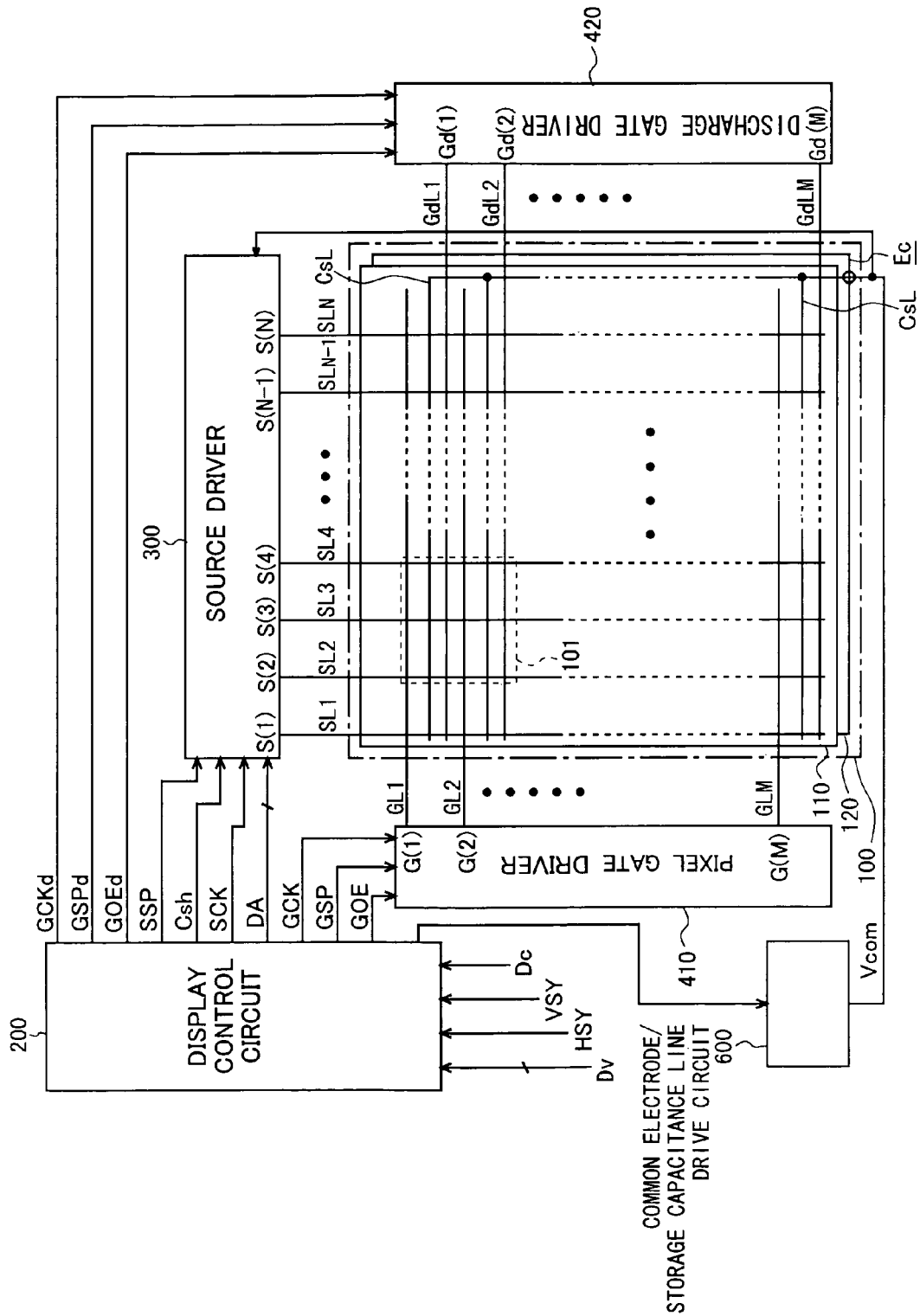
FIG. 5 is a block diagram showing a configuration of the liquid crystal display device according to the first embodiment.
Figure 6:
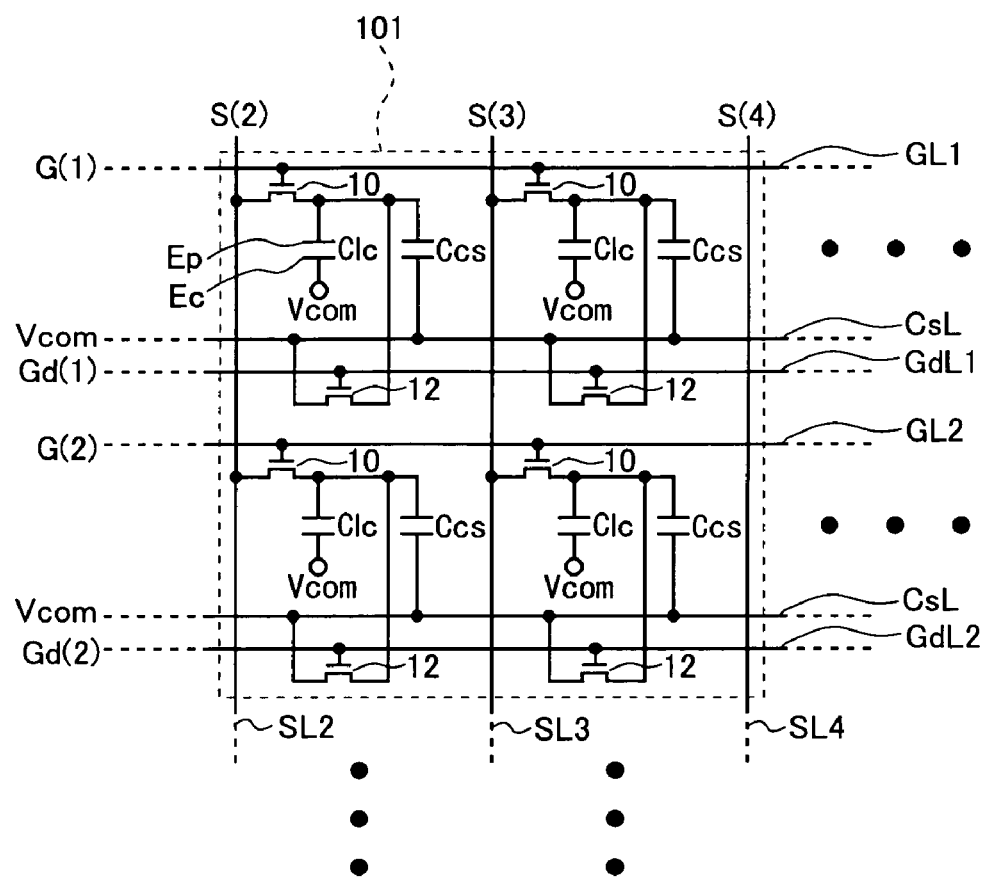
FIG. 6 is an equivalent circuit diagram showing an electrical configuration of the active matrix substrate in the first embodiment.

A first embodiment will be described as an example of a liquid crystal display device using an active matrix substrate according to the present invention. FIG. 5 is a block diagram showing a configuration of the liquid crystal display device according to the present embodiment. FIG. 6 is an equivalent circuit diagram showing a first example of a circuit configuration in an active matrix substrate 110 in the present embodiment, and shows an electrical configuration of a part of this active matrix substrate 110 (corresponding to a part of neighboring four pixels) 101.

This liquid crystal display device includes: an active matrix-type display part 100 using the active matrix substrate 110; a source driver 300 as a data signal line drive circuit; a pixel gate driver 410 as a pixel scanning signal line drive circuit; a discharge gate driver 420 as a discharge scanning signal line drive circuit; a common electrode/storage capacitance line drive circuit 600 as a common potential supply section and a storage capacitance line potential supply section; and a display control circuit 200 for controlling the source driver 300, the pixel gate driver 410, the discharge gate driver 420, and the common electrode/storage capacitance line drive circuit 600.

The display part 100 in the above liquid crystal display device includes a pair of electrode substrates sandwiching a liquid crystal layer and a polarizer plate is attached to each of the electrode substrates on the outside surface thereof. One of the above pair of electrode substrates is the active matrix substrate 110. As shown in FIG. 5 and FIG. 6, on an insulating substrate such as glass plate or the like in this active matrix substrate 110, there are formed: a plurality of (M) pixel gate lines GL1 to GLM as pixel scanning signal lines; a plurality of (N) source lines SL1 to SLN intersecting each of the pixel gate lines GL1 to GLM, as data signal lines; a plurality of (M×N) pixel circuits provided corresponding to the intersections of the pixel gate lines GL1 to GLM and the source lines SL1 to SLN, respectively; and a plurality of (M) discharge gate lines GdL1 to GdLM corresponding to the pixel gate lines GL1 to GLM, respectively. Each of the pixel circuits includes a TFT 10 as a switching element having a gate terminal connected to the pixel gate line GLj passing through the corresponding intersection and also having a source terminal connected to the source line SLi passing through the intersection (hereinafter, called "pixel TFT"), and a pixel electrode Ep connected to a drain terminal (electrode) of the pixel TFT 10.

On the other hand, the other one of the pair of electrode substrates is called an opposite substrate 120, and a common electrode Ec is formed there over the whole surface of an insulating substrate such as glass plate or the like. This common electrode Ec is provided commonly to each of the above plurality of (M×N) pixel circuits. Then, each of the pixel circuits in the active matrix substrate 110 constitutes a pixel formation portion together with the commonly provided common electrode Ec and the liquid crystal layer, and a liquid crystal capacitance Clc is formed by the pixel electrode Ep and the common electrode Ec in this pixel formation portion. Further, to securely retain the voltage of this pixel capacitance, a storage capacitance Ccs is provided in parallel to the liquid crystal capacitance Clc. That is, in the active matrix substrate 110, a storage capacitance line CsL is disposed in parallel to each of the pixel gate lines GLj, and the above storage capacitance Ccs is formed by this storage capacitance line CsL and the pixel electrode Ep which is disposed opposite the storage capacitance line CsL sandwiching an insulating film and the like. Accordingly, a capacitance to retain the written data signal S(i) as the pixel data (hereinafter, this capacitance is called a "pixel capacitance" and denoted by a symbol "Cp") is composed of the liquid crystal capacitance Clc and the auxiliary capacitance Ccs. That is, if these symbols "Cp", "Clc", and "Ccs" express also capacitance values, Cp=Clc+Ccs.

Further in the present embodiment, as shown in FIG. 6, each of the pixel circuits in the active matrix substrate 110 includes a TFT 12 as a discharge switching element (hereinafter, called "discharge TFT") in addition to the pixel TFT 10. Thereby, to each of the intersections of the pixel gate lines GL1 to GLM and the source lines SL1 to SLN, corresponds one of the pixel circuits and also correspond the pixel electrode Ep, the pixel TFT 10, and the discharge TFT 12 included in the pixel circuit. Accordingly, to each of the pixel electrodes Ep, correspond one of the pixel TFTs 10 and one of the discharge TFTs 12. Further, for each of the pixel gate lines GLj, the corresponding discharge gate line GdLj is disposed therealong in the present embodiment. A gate terminal in each of discharge TFTs 12 is connected to the discharge gate line GdLj corresponding to the pixel gate line GLj which is connected to the gate terminal of the corresponding pixel TFT 10, a drain terminal in each of the discharge TFTs 12 is connected to the corresponding pixel electrode Ep, and a source terminal in each of the discharge TFTs 12 is connected to the storage capacitance line CsL disposed so as to form the auxiliary capacitance together with the corresponding pixel electrode Ep. An active signal (voltage to turn on the TFT 12), when applied to any of the discharge gate lines GdLj in the active matrix substrate 110, turns on the discharge TFT 12 connected to the discharge gate line GdLj which is provided with the active signal, and the pixel electrode Ep in each of the pixel circuits, which the discharge gate line GdLj passes through, is electrically connected (shorted) to the storage capacitance line CsL via the discharge TFT 12.

As shown in FIG. 5 and FIG. 6, the pixel electrode Ep in each of the pixel formation portions is provided with a potential according to an image to be displayed from the source driver 300 and the pixel gate driver 410 which operates as will be described hereinafter, and the common electrode Ec is provided with a predetermined potential as a common potential Vcom (this common potential Vcom is also called "opposite voltage" or "common voltage") from the common electrode/storage capacitance line drive circuit 600. Thereby, a voltage according to a potential difference between the pixel electrode Ep and the common electrode Ec is applied to the liquid crystal, and this voltage application controls light transmittance of the liquid crystal layer and performs image display. Note that the polarizer plates are used for the light transmittance control by the voltage application to the liquid crystal layer, and in the liquid crystal display device according to the present embodiment the polarizer plates are disposed so as to realize the normally black mode. Here, the common potential Vcom provided to the common electrode Ec is also provided to the storage capacitance line CsL and the source driver 300, as shown in FIG. 5.

The display control circuit 200 receives a digital video signal Dv representing an image to be displayed, a horizontal synchronization signal HSY and a vertical synchronization signal VSY corresponding to the digital video signal Dv, and a control signal Dc for controlling display operation, from an external signal source, and, from these signals Dv, HSY, VSY, and Dc, generates and outputs a data start pulse signal SSP, a data clock signal SCK, a charge sharing control signal Csh, a digital image signal DA (signal corresponding to the video signal Dv) representing the image to be displayed, a pixel gate start pulse signal GSP, a pixel gate clock signal GCK, a pixel gate driver output control signal GOE, a discharge gate start pulse signal GSPd, a discharge gate clock signal GCKd, and a discharge gate driver output control signal GOEd, as signals for displaying the image represented by the digital video signal Dv on the display part 100. In more detail, the display control circuit 200 outputs the video signal Dv as the digital image signal DA, after performing timing adjustment or the like on the video signal Dv as needed with an internal memory, generates the data clock signal SCK as a signal composed of a pulse corresponding to each pixel of the image represented by the digital image signal DA, generates the data start pulse signal SSP as a signal exhibiting a high level (H level) during a predetermined period every one horizontal period based on the horizontal synchronization signal HSY, generates the pixel gate start pulse signal GSP and the discharge gate start pulse signal GSPd as signals exhibiting the H level during a predetermined period every one frame period (one vertical scanning period) based on the vertical synchronization signal VSY, generates the pixel gate clock signal GCK and the discharge gate clock signal GCKd based on the horizontal synchronization signal HSY, and generates the charge sharing control signal Csh, the pixel gate driver output control signal GOE, and the discharge gate driver output control signal GOEd based on the horizontal synchronization signal. HSY and the control signal Dc.

Among the signals generated in the display control circuit 200 as described above, the digital image signal DA, the charge sharing control signal Csh, the data start pulse signal SSP, and the data clock signal SCK are inputted into the source driver 300, the pixel gate start pulse signal GSP, the pixel gate clock signal GCK, and the pixel gate driver output control signal GOE are inputted into the pixel gate driver 410, and the discharge gate start pulse signal GSPd, the discharge gate clock signal GCKd, and the discharge gate driver output control signal GOEd are inputted into the discharge gate driver 420.

The source driver 300 generates data signals S(1) to S(N) as analog voltages corresponding to pixel values in each of the horizontal scanning lines (each display line) of the image represented by the digital image signal DA every one horizontal period (every 1H), based on the digital image signal DA, the data start pulse signal SSP, and the data clock signal SCK, and applies these data signals S(1) to S(N) to the source lines SL1 to SLN, respectively.

The present embodiment employs an nH dot inversion drive method, that is the drive method to invert the polarity of the voltage applied to the liquid crystal layer every one frame period and also to output the data signals S(1) to S(N) so as to invert the polarity every n pixel gate lines (n is two or more) and every one source line in each frame. Accordingly, the source driver 300 inverts the polarities of the applied voltages to the source lines SL1 to SLN every source line, and inverts the polarity of the data signal S(i) applied to each of the source lines SLi every n horizontal periods. Here, a base potential in the polarity inversion of the applied voltage to the source line is a DC level (potential corresponding to a direct current component) of the data signals S(1) to S(N), and this DC level is not generally the same as a DC level of the common electrode Ec and is different from the DC level of the common electrode Ec by a pull-in voltage ΔVd caused by a parasitic capacitance Cgd between the gate and drain of the pixel TFT in each of the pixel formation portions. Note that, when the pull-in voltage ΔVd by the parasitic capacitance Cgd is sufficiently smaller than an optical threshold voltage Vth of the liquid crystal, the DC level of the data signals S(1) to S(N) can be assumed to be equal to the DC level of the common electrode Ec, and therefore the polarity of the data signals S(1) to S(N), that is, the polarities of the applied voltages to the source lines may be considered to be inverted every n horizontal periods with reference to the potential Vcom of the common electrode Ec.

Figure 7:
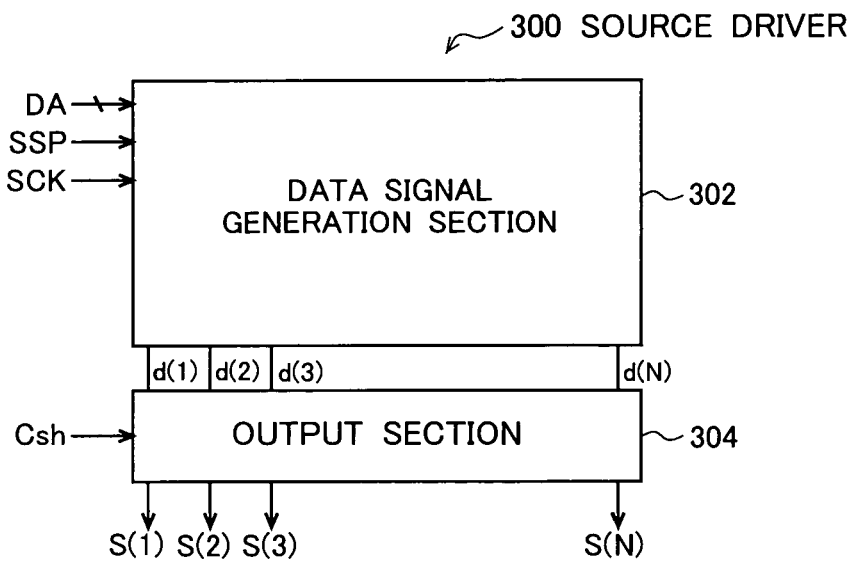
FIG. 7 is a block diagram showing a configuration of a source driver in the liquid crystal display device according to the first embodiment.

FIG. 7 is a block diagram showing a configuration of the source driver 300 in the present embodiment. This source driver 300 is configured with a data signal generation section 302 and an output section 304. The data signal generation section 302 generates analog voltage signals d(1) to d(N) corresponding to the source lines SL1 to SLN, respectively, from the digital image signal DA according to the data start pulse signal SSP and the data clock signal SCK. The configuration of this data signal generation section 302 is the same as that of a conventional source driver and description thereof will be omitted. The output section 304 performs impedance conversion on the analog voltage signal d(i) generated in the data signal generation section 302 and outputs the converted signal as the data signal S(i) (i=1, 2, ..., N).

Figure 8:
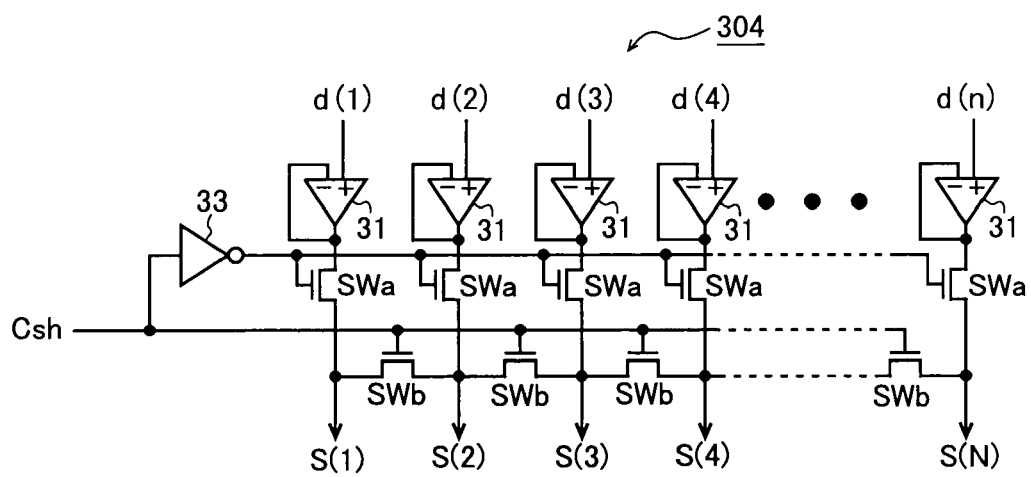
FIG. 8 is a circuit diagram showing a first configuration example of an output section of the above source driver.

Further, this source driver 300 employs the charge sharing method in which the neighboring source lines are shorted with each other for reducing power consumption during a predetermined period (period as short as a horizontal blanking period) Tsh when the polarity in each of the data signals S(i) (i=1, 2, ..., N) is inverted. For this purpose, the output section 304 of the source driver 300 is configured as shown in FIG. 8. That is, this output section 304 receives the analog voltage signals d(1) to d(N) generated based on the digital image signal DA, and generates' the data signals S(1) to S(N), as image signals to be transmitted over the source lines SL1 to SLN, by performing the impedance conversion on these analog voltage signals d(1) to d(N). The output section 304 includes N output buffers 31 as voltage followers for this impedance conversion. The output terminal of each of the buffers 31 is connected with a first MOS (Metal Oxide Semiconductor) transistor SWa as a switching element, and the data signal S(i) from each of the buffers 31 is outputted from the output terminal of the source driver 300 via the first MOS transistor SWa (i=1, 2, ..., N). Further, the neighboring output terminals of the source driver 300 are connected to a second MOS transistor SWb as a switching element (thereby, the neighboring source lines are connected with each other by the second MOS transistor SWb). Then, to the gate terminal of the second MOS transistor SWb between these output terminals, the charge sharing control signal Csh is provided from the display control circuit 200, and, to the gate terminal of the first MOS transistor SWa connected to the output terminal of each of the buffers 31, an output signal of an inverter 33, that is, a logically inverted signal of the charge sharing control signal Csh is provided.

According to the above configuration, when the charge sharing control signal Csh is not active (low level), the first MOS transistor SWa is turned on (conduction state) and the second MOS transistor SWb is turned off (cut-off state), and thereby the data signal from each of the buffers 31 is outputted from the source driver 300 via the first MOS transistor SWa. On the other hand, when the charge sharing control signal Csh is active (high level), the first MOS transistor SWa is turned off (cut-off state) and the second MOS transistor SWb is turned on (conduction state), and thereby the data signal from each of the buffers 31 is not outputted (i.e., the application of the data signals S(1) to S(N) to the source lines SL1 to SLN is cut off) and the neighboring source lines in the display part 100 are shorted with each other via the second MOS transistor SWb.

Figure 9:
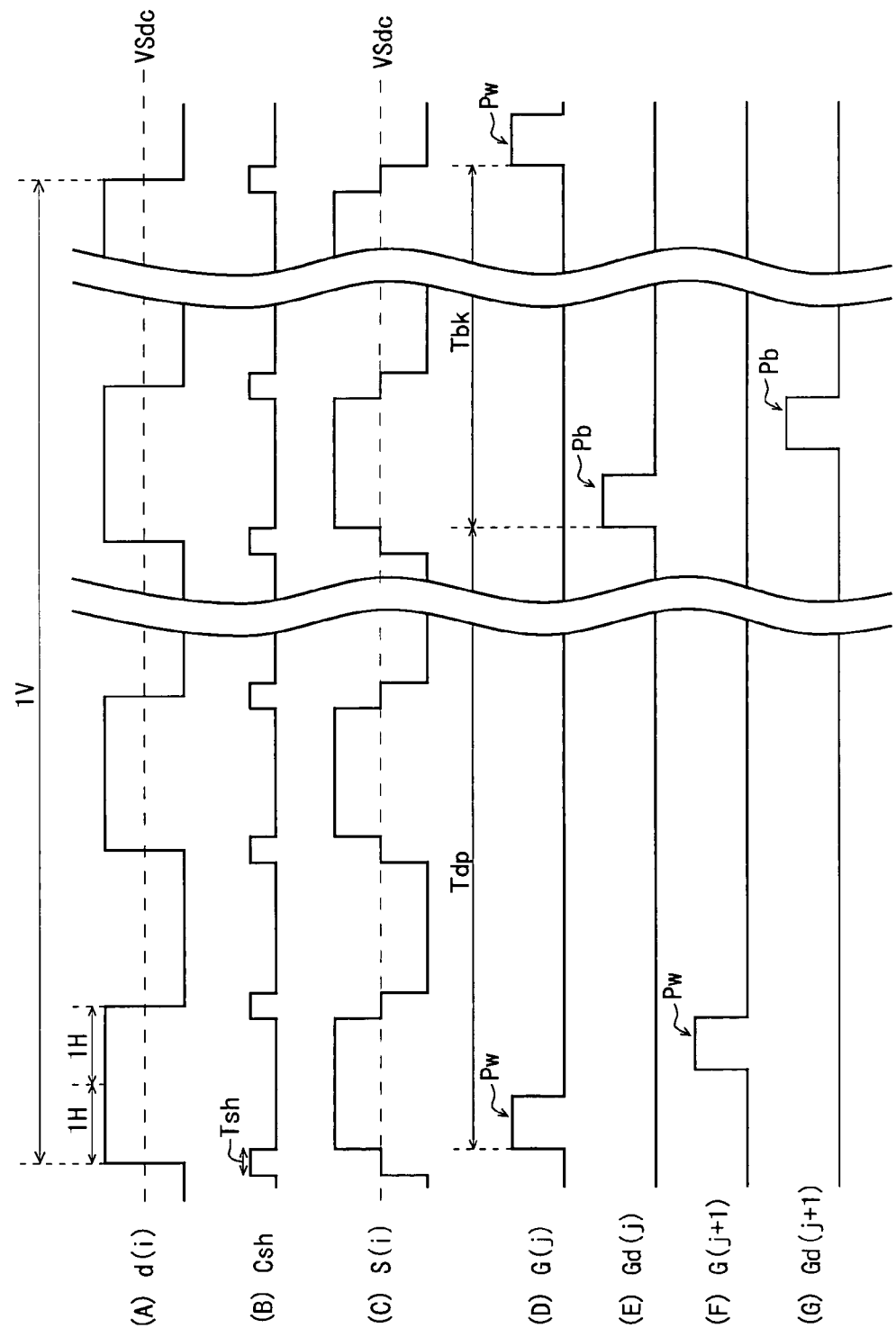
FIG. 9 consists of signal waveform charts (A) to (G) for explaining the operation of the liquid crystal display device according to the first embodiment.

The source driver 300 of the present configuration generates the analog voltage signal d(i) as a video signal whose polarity is inverted every n horizontal periods (nH), here, every two horizontal periods (2H) for n=2, as shown in (A) of FIG. 9, and the display control circuit 200 generates the charge sharing control signal Csh which exhibits the high level (H level) during such a short period Tsh as one horizontal blanking period when the polarity in each of the analog voltage signals d(i) is inverted, as shown in (B) of FIG. 9.

Here, the polarity of the analog voltage signal d(i) is determined with reference to a source center potential (DC level of the data signal S(i)) VSdc corresponding to a center value between the minimum and maximum values of the data signal S(i). This point will be the same in the following description, and the polarity of the data signal S(i) is determined in the same manner. Further, the period Tsh, during which the charge sharing control signal Csh shown in (B) of FIG. 9 exhibits the H level, is a period during which the neighboring data signal lines are shorted with each other for the charge redistribution and is called a "charge sharing period".

As described above, the source driver 300 outputs each of the analog voltage signals d(i) as the data signal S(i) when the charge sharing control signal Csh exhibits the low level (L level), and the application of the data signals S(1) to S(N) to the source lines SL1 to SLN is cut off and also the neighboring source lines are shorted with each other when the charge sharing signal Csh exhibits the H level. Since the present configuration employs the nH dot inversion drive method and the voltages of the neighboring source lines have polarities opposite to each other, the voltage of each of the source lines SLi changes toward a certain intermediate potential between the positive polarity data signal voltage and the negative polarity data signal voltage in the charge sharing period Tsh.

Figure 11:
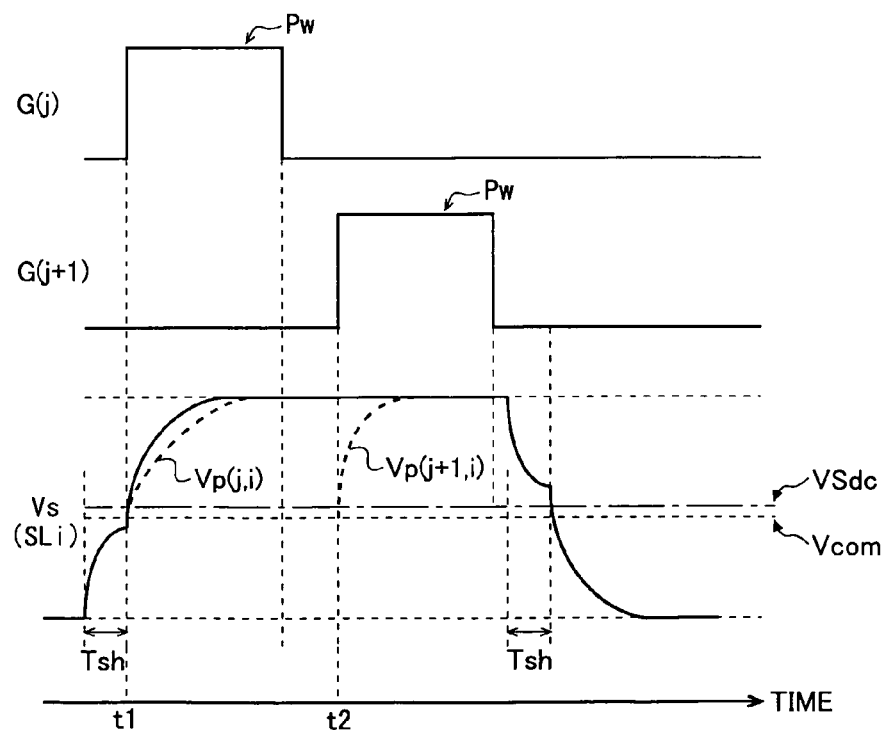
FIG. 11 is a detailed signal waveform chart for explaining the operation of the active matrix substrate in the first embodiment.

In the present liquid crystal display device, each of the data signals S(i) changes the polarity with reference to the source center potential VSdc which is the DC level of the data signal S(i), and this source center potential VSdc has a value close to the common potential Vcom. Then, as shown in (C) of FIG. 9, each of the data signals S(i) becomes to exhibit a potential equal to the source center potential VSdc in the charge sharing period Tsh by the charge sharing operation. Note that an ideal data signal waveform is shown here, and, in an actual case, the value of each of the data signals S(i), that is, the voltage Vs of each of the source lines SLi changes as shown in FIG. 11 which will be described in the following, and becomes a potential approximately equal to the source center potential VSdc, that is, a potential close to the common potential Vcom at the end timing of each of the charge sharing periods Tsh. Note that a configuration to make the voltage Vs of each of the source lines SLi approximately equal to the DC level VSdc of the data signal S(i), by shorting the neighboring source lines each other when the polarity of the data signal is inverted, is not limited to the configuration shown in FIG. 8.

The pixel gate driver 410 selects sequentially one of the pixel gate lines GL1 to GLM during approximately one horizontal period in each frame period (each vertical scanning period) of the digital image signal DA in order to write each of the data signals S(1) to S(N) into each of the pixel formation portions (pixel capacitances of the pixel formation portions) according to the pixel gate start pulse signal GSP, the pixel gate clock signal GCK, and the pixel gate driver output control signal GOE. That is, the pixel gate driver 410 applies the scanning signals G(1) to G(M), including pixel data write pulses Pw as shown in (D) and (F) of FIG. 9, to the pixel gate lines GL1 to GLM, respectively. Thereby, the pixel gate line GLj, to which the pulse Pw is applied, enters a selected state and the pixel TFT 10 connected to the pixel gate line GLj in the selected state is turned on (pixel TFT 10 connected to the pixel gate line in an unselected state is turned off). Here, the pixel data write pulse Pw exhibits the H level during the effective scanning period corresponding to a display period in the horizontal period (1H).

The discharge gate driver 420 selects sequentially one of the discharge gate lines GdL1 to GdLM during approximately one horizontal period in each frame period in order to discharge the charge accumulated in the pixel capacitance Cp for each of the pixel formation portions according to the discharge gate start pulse signal GSPd, the discharge gate clock signal GCKd, and the discharge gate driver output control signal GOEd. That is, the discharge gate driver 420 applies the discharge scanning signals Gd(1) to Gd(M), including pulses Pb as shown in (E) and (G) of FIG. 9, to the discharge gate lines GdL1 to GdLM, respectively. Thereby, the discharge gate line GdLj, to which the pulse Pb is applied, enters a selected state and the discharge TFT 12 connected to the discharge gate line GdLj in the selected state is turned on (discharge TFT 12 connected to the discharge gate line in an unselected state is turned off). Since the present embodiment performs display in the normally black mode, the discharge in each of the pixel capacitances Cp, by the pulse Pb in each of the discharge scanning signals Gd(j) (j=1, 2, . . . , M), means application of a voltage corresponding to the black display (hereinafter, called "black voltage") to each of the pixel capacitances Cp. Accordingly, this pulse Pb is called a "black voltage application pulse", hereinafter.

The black voltage application pulse Pb, which is included in the discharge scanning signal Gd(j) applied to each of the discharge gate lines GdLj, corresponds to the pixel data write pulse Pw which is included in the pixel scanning signal G(j) applied to the pixel gate line GLj corresponding to the discharge gate line GdLj. Then, as shown in (D) to (G) of FIG. 9, each of the black voltage application pulses Pb appears being delayed after the pixel data write pulse Pw corresponding thereto, by a predetermined period Tdp. This predetermined period Tdp is a period during which a voltage corresponding to the pixel data is retained in the pixel capacitance Cp, and the period is shorter than one frame period (1V) and is approximately ⅔ frame periods, for example. Hereinafter, this predetermined period Tdp is called a "image display period".

In each of the pixel formation portions, the potential of the source line SLi, which is connected to the source terminal of the pixel TFT 10, is applied to the pixel electrode Ep via the pixel TFT 10 while the pixel TFT inside the pixel formation portion is in an ON state by the pixel data write pulse Pw. Thereby, the data signal S(i) as the voltage of the source line SLi is written into the pixel capacitance Cp corresponding to the pixel electrode Ep. Then, after the above image display period Tdp has elapsed, the black voltage application pulse Pb is provided to the gate terminal of the discharge TFT 12 inside the pixel formation portion, and thereby the pixel electrode Ep is connected (shorted) to the storage capacitance line CsL via the discharge TFT 12 while the discharge TFT 12 is in an ON state. As a result, the accumulated charge of the pixel capacitance Cp inside the pixel formation portion is discharged and the pixel capacitance Cp enters a state of the black voltage application.

Accordingly, each of the pixel formation portions retains the voltage corresponding to the potential of the source line SLi, which is applied to the pixel electrode Ep via the pixel TFT 10 inside the pixel formation portion in the pixel capacitance Cp during the image display period Tdp, and thereby forms a display pixel based on the digital image signal DA. On the other hand, during a period Tbk from the timing when the black voltage application pulse Pb appears in the discharge scanning signal Gd(j) applied to the gate terminal of the discharge TFT 12 inside the pixel formation portion to the timing when the next pixel data write pulse Pw appears in the pixel scanning signal G(j) applied to the gate terminal of the pixel TFT 10 inside the pixel formation portion (remaining period when the image display period Tdp is eliminated from the one frame period), each of the pixel formation portions forms a black pixel by retaining the black voltage in the pixel capacitance Cp therein. As a result, the display line corresponding to the discharge scanning signal Gd(j) provides the black display during the period Tbk (hereinafter, this period Tbk is called a "black display period"). Accordingly, the present embodiment realizes the impulse type display by inserting the black display period every display line, while suppressing the complication of the drive circuit, etc. and the increase in the operating frequency. Thereby, the tail dragging residual image is suppressed in the moving image and the display quality of the moving image is improved.

The common electrode/storage capacitance line drive circuit 600 provides the common potential Vcom, which is a predetermined fixed potential, to the common electrode Ec on the opposite substrate 120 and also to the storage capacitance line CsL on the active matrix substrate 110, under the control of the display control circuit 200. This common electrode/storage capacitance line drive circuit 600 functions as a common potential supply section which provides the common potential Vcom to the common electrode Ec and also functions as a storage capacitance line potential supply section which provides the common potential Vcom to the storage capacitance line CsL as a storage capacitance line potential. Note that, while the common potential and the storage capacitance line potential are the same in the present embodiment, these potentials may be different as will be described later.

1.2 Functions and Advantages

Figure 10:
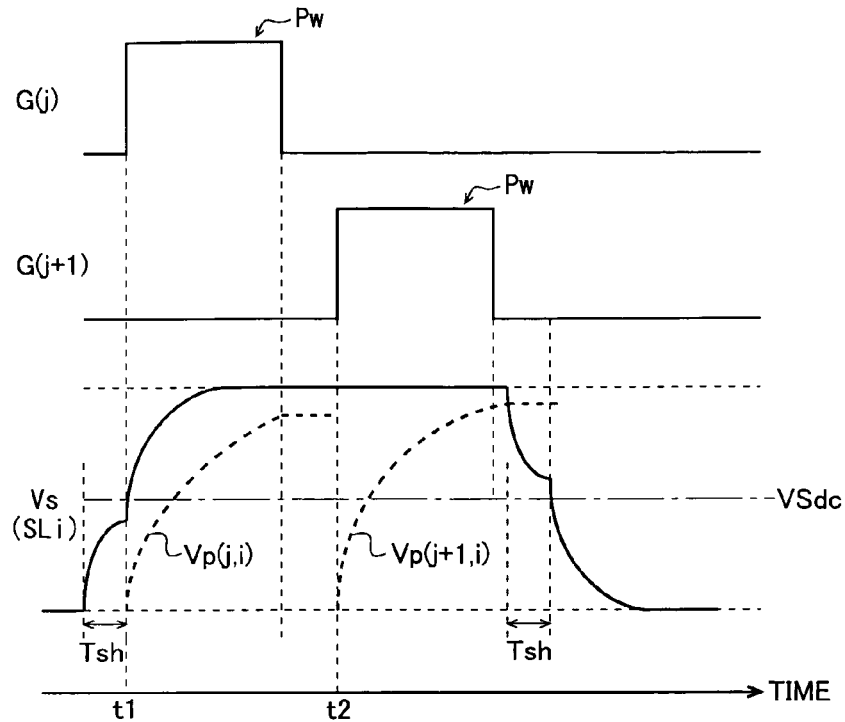
FIG. 10 is a detailed signal waveform chart for explaining the operation of an active matrix substrate in a conventional liquid crystal display device with a 2H dot inversion drive employing a charge sharing method.

FIG. 10 is a detailed signal waveform chart showing an operation of an active matrix substrate in a conventional liquid crystal display device using the 2H dot inversion drive employing the charge sharing method. In this conventional liquid crystal display device, the potential Vs of each of the source lines SLi becomes approximately equal to the source center potential VSdc in the charge sharing period Tsh. However, before the pixel capacitance Cp starts to be charged for the pixel data writing by the pixel data write pulse Pw in the pixel scanning signal G(j), to the pixel capacitance Cp, the potential of the source line SLi in the previous frame period, that is, the pixel data indicated by the data signal S(i) having the different polarity has been already written. Thereby, at a start timing t1 of the charging by this pixel data write pulse Pw, the potential Vp(j, i) of the pixel electrode Ep forming the pixel capacitance Cp has a negative polarity potential corresponding to the pixel data written in the previous frame period. Therefore, when one horizontal period becomes shorter for a higher resolution display or the like, the potential Vp (j, i) of the pixel electrode Ep in the first one of the two lines which are a unit of the polarity inversion in the 2H inversion drive does not reach the target potential within the period of the pixel data write pulse PW (period during which the pixel gate line GLj is in the selected state) as shown in FIG. 10, causing the charging shortage.

The potential Vp(j+1, i) of the pixel electrode Ep in the second one of the two lines as the above polarity inversion unit similarly is the negative polarity potential corresponding to the pixel data written in the previous frame period, at a start timing t2 of the charging by the pixel data write pulse Pw in the pixel scanning signal G(j+1). However, the potential Vs of the source line SLi is the target potential already at the charging start timing t2 of this second line pixel capacitance Cp. Therefore, even when the potential Vp(j+1, i) of the pixel electrode Ep in the second line does not reach the target potential within the period of the pixel data write pulse Pw, the potential Vp(j+1, i) is higher than the potential Vp(j, i) of the pixel electrode Ep in the first line, as shown in FIG. 10.

As described above, in the conventional liquid crystal display device using the 2H dot inversion drive, even if the charge sharing method is employed, a difference of the charge amount is caused between the pixel capacitance in the first line and that in the second line, of the two lines as the unit of polarity inversion when one horizontal period becomes shorter for the higher resolution display or the like. As a result, this difference appears in a luminance difference and sometimes the horizontal irregularity is viewed in a line shape.

On the other hand, the present embodiment carries out the charge sharing operation as same as the above conventional example in the liquid crystal display device with the 2H dot inversion drive method as shown in (A) to (C) of FIG. 9, and additionally shorts each of the pixel electrodes Ep to the storage capacitance line CsL via the discharge TFT 12 by the black voltage application pulse Pb as shown in (E) and (G) of FIG. 9. Since the storage capacitance line CsL is provided with the common potential Vcom, each of the pixel capacitances Cp discharges after the image display period Tdp of about ⅔ frame periods has elapsed from the charging thereof by the data signal S(i) (potential of the source line SLi) corresponding to the pixel data. As a result, at the start timing t1 of the charging by the pixel data write pulse Pw in the pixel scanning signal. G(j) for the pixel capacitance Cp in the first line of the two lines as the unit of polarity inversion, the potential Vp(j, i) of the pixel electrode Ep in the first line is equal to the potential of the storage capacitance line CsL, that is, the common potential Vcom due to the discharge of the pixel capacitance Cp by the black voltage application pulse Pb in the discharge scanning signal Gd(i) before the timing t1. Further, the potential of the source line SLi is approximately the same as the source center potential VSdc (potential close to the common potential Vcom) by the charge sharing operation as in the conventional example. Therefore, the potential Vp(j, i) of the pixel electrode Ep in the first line reaches the target potential during the period of the pixel data write pulse Pw as shown in FIG. 11, and the charging shortage is suppressed.

Further, also at the start timing t2 of the charging by the pixel data write pulse Pw in the image scanning signal G(j+1) for the pixel capacitance Cp in the second line of the two lines as the unit of polarity inversion, the potential Vp(j+1, i) of the pixel electrode Ep in the second line is the same as the potential of the storage capacitance line CsL, that is, the common potential Vcom due to the discharge of the pixel capacitance Cp by the black voltage application pulse Pb in the discharge scanning signal Gd(j+1) before the timing t2. Then, the potential Vs of the source line SLi is already the target potential at this timing t2. Therefore, the potential Vp(j+1, i) of the pixel electrode Ep in the second line also reaches the target potential in the period of the pixel data write pulse Pw as shown in FIG. 11, similarly to the potential Vp(j, i) of the pixel electrode Ep in the first line, and the charging shortage is suppressed.

In this manner, according to the present embodiment, while the potential Vs of the source line SLi is different between the first line and the second line of the two lines as the unit of polarity inversion in the 2H inversion drive, at the charge start timings t1 and t2 of the pixel capacitance Cp, both of the potentials Vp(j, i) and Vp(j+1, i) of the pixel electrode Ep are the common potential Vcom. Therefore, the potentials of pixel electrode Ep, Vp(j, i) and Vp(j+1, i) reach the target potential in the two lines, respectively, by the pixel data write pulse Pw, and a substantial difference is not caused between the charge amount of the pixel capacitance in the first line of the two lines and the charge amount of the pixel capacitance in the second line, and the horizontal irregularity in a line shape is not viewed. Further, as described above, by inserting the black display period Tbk for each display line utilizing the discharge of the pixel capacitance Cp through the black voltage application pulse Pb, it is possible to realize the impulse type display while suppressing the complication of the drive circuit, etc. and the increase in the operating frequency. Thereby, it is possible to suppress the tail-dragging residual image and to improve the display quality of the moving image. In this manner, the present embodiment can improve the display quality of the moving image by realizing the impulse type display while suppressing the complication of the drive circuit, etc. and the increase in the operating frequency, and also can realize a higher display quality by improving the charging characteristic of the pixel capacitance (suppression of the charge amount difference and elimination of the charging shortage), in the active matrix-type liquid crystal display device which is the hold type display device.

Note that the present embodiment employs the charge sharing method assuming the dot inversion drive, but can provide basically the same effect even when not employing the charge sharing method or when not employing the dot inversion drive. However, it is preferable to employ the charge sharing method from the viewpoint of improving the charging characteristic of the pixel capacitance.

1.3 Pattern Configuration of the Active Matrix Substrate

Next, a pattern configuration of the active matrix substrate 110 for realizing the liquid crystal display device according to the above embodiment will be described with reference to FIG. 1 to FIG. 4.

FIG. 1 is a plan view of a first pattern configuration example of the active matrix substrate 110 in the present embodiment, and shows the pattern configuration of a part corresponding to six pixels. The pixel TFT 10 is provided in the neighborhood of the intersection of the pixel gate line GLj and the source line SLi (i=1, 2, . . . , N, and j=1, 2, . . . , M). In this example, the pixel gate line GLj works also as a gate electrode (terminal) 10g of the pixel TFT 10, a source electrode (terminal) 10s of the pixel TFT 10 is connected to the source line SLi, and a drain electrode (terminal) 10d is connected to the pixel electrode Ep via a contact hole 11 provided in an interlayer insulating film.

Further, the discharge gate line GdLj is disposed so as to extend along the pixel gate line GLj, and the discharge TFT 12 is disposed in the neighborhood of the discharge gate line GdLj. A gate electrode (terminal) 12g of this discharge TFT 12 is connected to the discharge gate line GdLj, a source electrode (terminal) 12s of the discharge TFT 12 is connected to the storage capacitance line CsL via a source extraction electrode 14 and a contact hole 15, and a drain electrode (terminal) 12d thereof is connected to the above pixel electrode Ep via a contact hole 17.

In the example of FIG. 1, the source extraction electrode 14 and a drain extraction electrode 13, which are connected to the source electrode 12s and the drain electrode 12d of the discharge TFT 12, respectively, do not overlap the discharge gate line GdLj. With this configuration, when the discharge TFT 12 is always in a conduction state caused by a residual film defect or the like in a channel portion of the discharge TFT 12 (in a case of a short fault), it is possible to repair the short fault by cutting the source extraction electrode 14 or the drain extraction electrode 13 through laser irradiation or the like. Further, in the example of FIG. 1, the pixel electrode Ep overlaps the discharge gate line GdLj and the discharge TFT 12. This pattern configuration makes the pixel area wider and thereby is effective for improving the aperture ratio.

Note that it is preferable to form the source electrode 12s and the drain electrode 12d of the discharge TFT 12 as well as the electrodes connected to the electrodes 12s and 12d, respectively, using the same material as that of the source line SLi (similar in the other pattern configuration examples). The reason is that this makes it possible to form the source electrode 12s and the drain electrode 12d of the discharge TFT 12 as well as the electrodes connected to the electrodes 12s and 12d, respectively, in a formation process of the source line SLi, and it is not necessary to form these electrodes separately.

Figure 2:
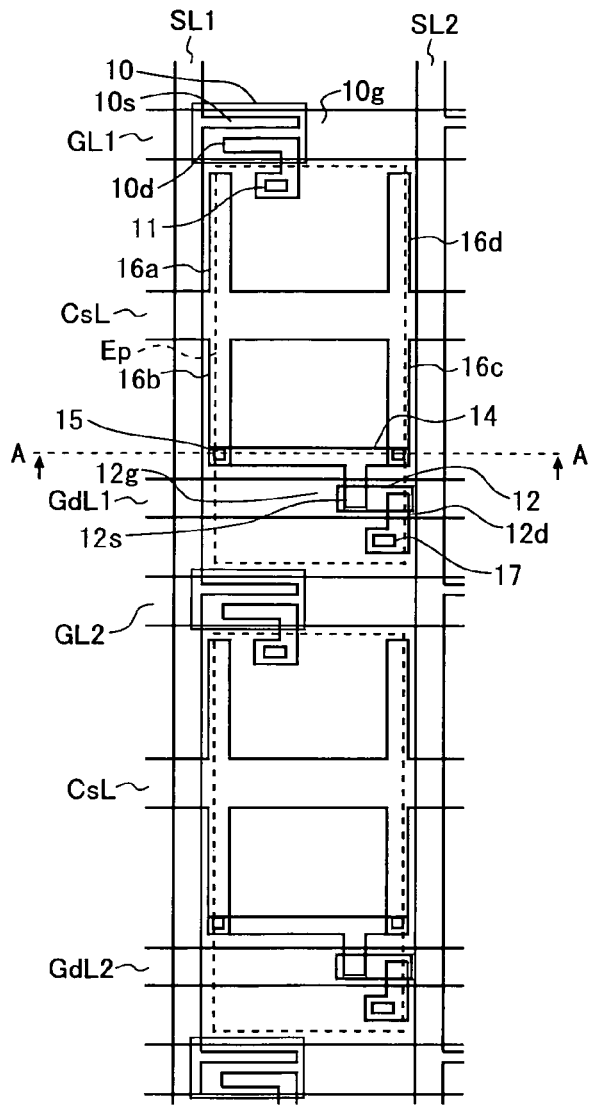
FIG. 2 is a plan view showing a second pattern configuration example for the active matrix substrate in the first embodiment.
Figure 3:
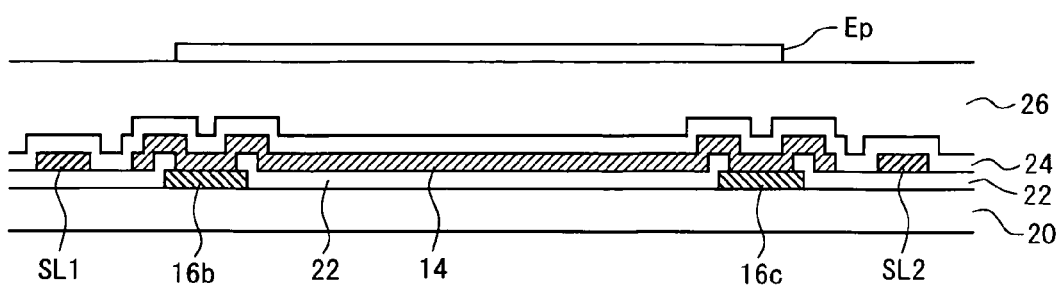
FIG. 3 is a cross-sectional view taken along the line A-A in FIG. 2.

FIG. 2 is a plan view showing a second pattern configuration example of the active matrix substrate 110 according to the present embodiment and shows a pattern configuration of a part corresponding to two pixels. FIG. 3 is a cross-sectional view taken along the line A-A in FIG. 2. A constituent of this second example which is the same as or corresponding to that of the first example is denoted by the same reference symbol and numeral and description of the same part will be omitted below.

In this second example, the storage capacitance line CsL, disposed so as to pass through the center of the pixel electrode Ep in parallel to the pixel gate line GLj (j=1, 2, . . . , M), has four extended portions 16a to 16d extending along the edge of the pixel electrode Ep in parallel to the source line SLi in each of the pixel circuits These extended portions 16a to 16d function as shield electrodes for suppressing influence of potential changes in the source lines SL1 and SL2 on the pixel electrode Ep. Among these four extended portions 16a to 16d, the extended portions 16b and 16c extending toward the discharge gate line GdLj are connected with each other at the ends by the source extraction electrode 14 via the contact holes 15, and the source extraction electrode 14 is connected to the source electrode 12s of the discharge TFT 12.

That is, as shown in FIG. 3, the extended portions 16b and 16c of the storage capacitance line CsL and a gate insulating film 22 made of silicon nitride (SiNx) or the like are formed sequentially on a glass substrate 20 of a transparent insulating substrate, and the source extraction electrode 14 formed thereon is electrically connected to the extended portion 16b and 16c of the storage capacitance line CsL via the contact holes 15 provided in the gate insulating film 22. On this source extraction electrode 14, an interlayer insulating film 24 made of silicon nitride or the like as a passivation film and an interlayer insulating film 26 made of acryl photo-sensitive resin or the like are formed sequentially, and further the pixel electrode Ep made of ITO (Indium Tin Oxide) or the like is formed thereon as a transparent electrode.

Thus, in the second example the source extraction electrode 14, which is a different layer from the discharge gate line GdLj, is formed at a position adjacent to the discharge gate line GdLj. Thereby, it is possible to prevent short between the storage capacitance line CsL and the discharge gate line GdLj. Further, it is possible to reduce a line breaking probability, because a part of the storage capacitance line CsL is formed in a different layer.

Further in this second example, as shown in FIG. 2, the discharge gate line GdLj is used also for the gate electrode (terminal) of the discharge TFT 12, and this discharge TFT 12 is covered by the discharge gate line GdLj via an insulating layer. Considering yield of producing the active matrix substrate, it is advantageous to use the first example in which the discharge TFT 12 as well as the source extraction electrode and drain extraction electrode thereof do not overlap the discharge gate line GdLj, but this second example has an advantage in terms of the aperture ratio.

Figure 4:
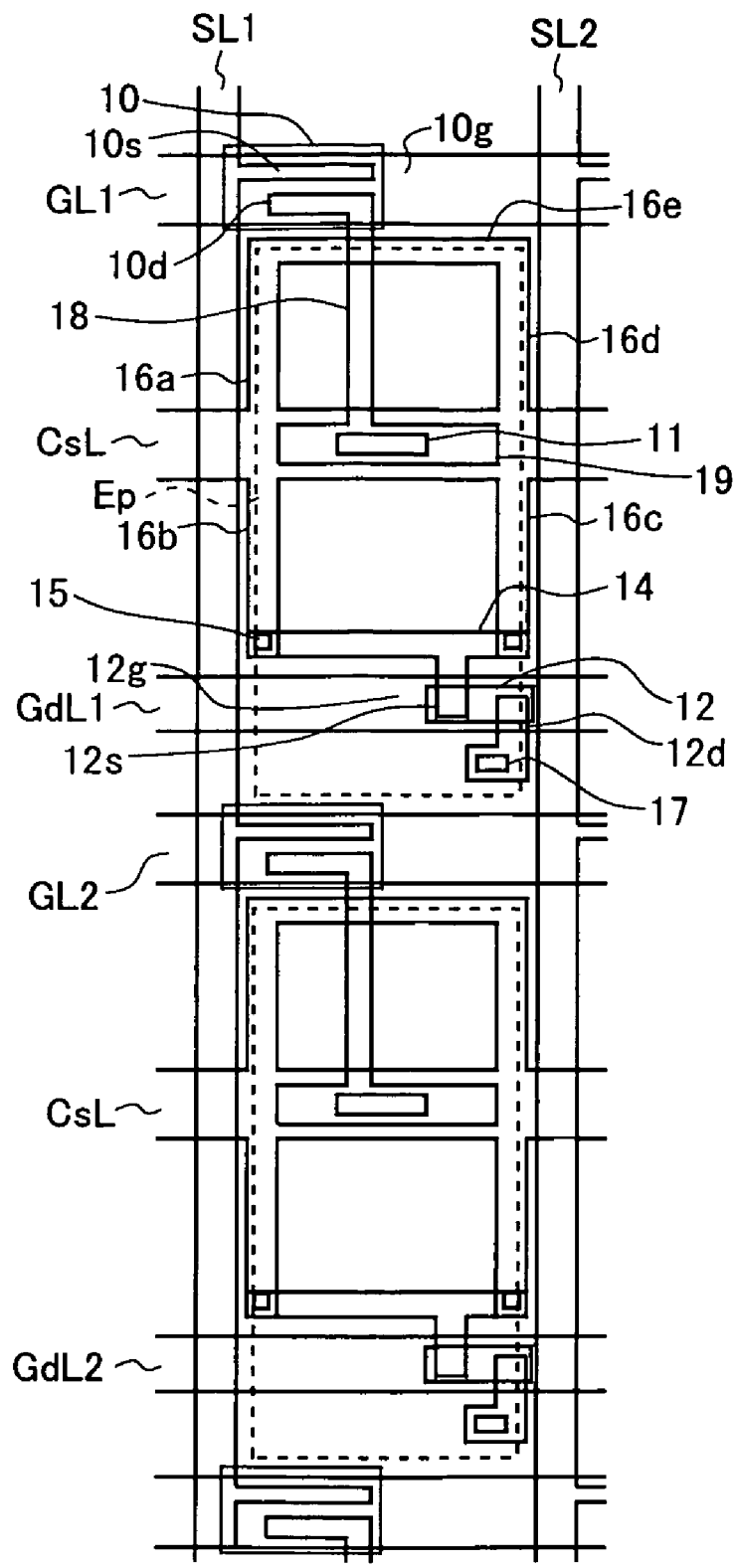
FIG. 4 is a plan view showing a third pattern configuration example for the active matrix substrate in the first embodiment.

FIG. 4 is a plan view showing a third pattern configuration example of the active matrix substrate 110 according to the present embodiment, and shows a pattern configuration of a part corresponding to two pixels. A constituent of this third example which is the same as or corresponding to that of the first or the second example is denoted by the same reference symbol and numeral and detailed description of the same part will be omitted below.

In this third example, as in the above second example, the storage capacitance line CsL has four extended portions 16a to 16d extending along the edge of the pixel electrode Ep in parallel to the source line SLi in each of the pixel circuits in order to suppress the influence of the potential changes of the source lines SL1 and SL2 on the potential of the pixel electrode Ep. Among these extended portions 16a to 16d, the extended portions 16a and 16d extending toward the gate line GLj are connected with each other by an electrode 16e extending along the edge of the pixel electrode Ep in parallel to the pixel gate line GLj: (hereinafter, called "horizontal extended portion"), and are formed together with this horizontal extended portion 16e as a pattern combined with the storage capacitance line CsL. This horizontal extended portion 16e functions as a shield electrode for suppressing influence of the potential change of the pixel gate line GLj to the potential of the pixel electrode Ep. Further, as in the second example, the extended portions 16b and 16c extending toward the discharge gate line GdLj are connected with each other at the ends by the source extraction electrode 14 via the contact holes 15, and the source extraction electrode 14 is connected to the source electrode 12s of the discharge TFT 12.

In this third example, a circular structure is constituted by the five extended portions 16a to 16e of the storage capacitance line CsL formed along the edge of the pixel electrode Ep and by the source extraction electrode 14, in this manner. By forming such a circular structure as a part of the storage capacitance line CsL, it is possible to reduce a parasitic capacitance formed by the pixel electrode Ep and the source line SLi as well as a parasitic capacitance formed by the pixel electrode Ep and the pixel gate line GLj, and to improve the display quality.

Note that, since the storage capacitance line CsL has the horizontal extended portion 16e as described above, the drain electrode 10d of the pixel TFT 10 is connected to the pixel electrode Ep at the center of the pixel electrode Ep via a drain extraction electrode 18 and the contact hole 11. Further, the drain extraction electrode 18 has a portion 19 facing the storage capacitance line CsL at this connection part, and the storage capacitance Ccs is formed with this portion 19 as a storage capacitance electrode facing the storage capacitance line CsL via an insulating film.

1.4 Other Configuration Examples of the Source Driver

As described above, in the present embodiment, the output section 304 of the source driver 300 is configured as shown in FIG. 8 (hereinafter, the configuration shown in FIG. 8 is called a "first configuration example"). In this configuration, the potential Vs of each of the source lines SLi changes toward the intermediate potential close to the source center potential VSdc in the charge sharing period Tsh, but is not secured completely to reach the source center potential VSdc or the common potential Vcom within the charge sharing period Tsh. However, as apparent from FIG. 11, it is preferable, from the viewpoint of improving the charging characteristic, to enable the potential Vs of each of the source lines SLi to reach the common potential Vcom or the source center potential VSdc within the charge sharing period Tsh.

Figure 12:
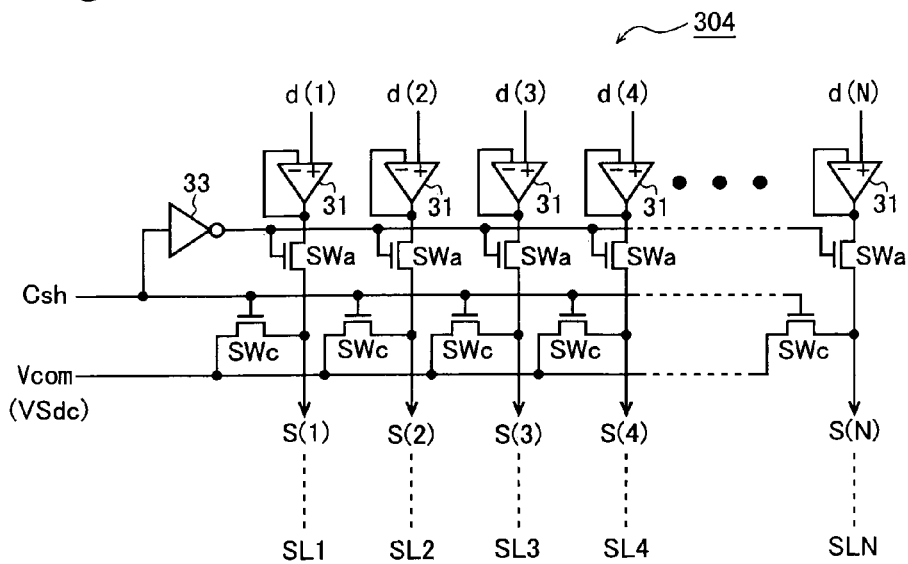
FIG. 12 is a circuit diagram showing a second configuration example of the output section of the above source driver.

FIG. 12 is a circuit diagram showing a configuration example (hereinafter, called "second configuration example") of the output section 304 of the source driver 300 for enabling the potential Vs of each of the source lines SLi to reach the common potential Vcom within the charge sharing period Tsh. In this configuration example, a constituent of the output section 304 which is the same as that in the first embodiment is denoted by the same reference symbol and numeral and description thereof will be omitted.

The output section 304 in the present configuration example is also provided with one second MOS transistor SWc as a switching element for each of the source lines SLi (i=1, 2, . . . , N) as in the first configuration example. However, while the switch circuit is configured in the first configuration example such that the second MOS transistor SWb is inserted one by one between the neighboring source lines, the switch circuit is configured in the present configuration example such that the source driver 300 has an input terminal (hereinafter called "common potential input terminal") for receiving the common potential Vcom from the outside thereof and the second MOS transistor SWc is inserted one by one between the common potential input terminal and each of the source lines SLi. That is, in the present configuration example, the output terminal of the source driver to be connected to each of the source lines SLi is connected to the common potential input terminal via any one of these second MOS transistors SWc. Then, the charge sharing control signal Csh is provided to all the gate terminals of the second MOS transistors SWc.

In the second configuration example as described above, according to the charge sharing control signal Csh, the analog voltage signals d(1) to d(N), which are generated by the data signal generation section 302, are outputted as the data signals S(1) to S(N) and applied to the source lines SL1 to SLN via the buffer 31, respectively, during the (effective scanning) period except for the charge sharing period Tsh, and the application of the data signals S(1) to S(N) to the respective source lines SL1 to SLN is cut off and also all the source lines SL1 to SLN are connected to the common potential input terminal during the charge sharing period Tsh. Therefore, in the charge sharing period Tsh, by the charge sharing operation to short the source lines SL1 to SLN with each other and by the supply of the common potential Vcom via the common potential input terminal, each of the source lines SLi has the common potential Vcom. Accordingly, by using the source driver according to this second configuration example, the potential of each of the source lines SLi is always the common potential Vcom in each of the charge sharing periods Tsh without depending on the display gradation, and, additionally by the pixel capacitance discharge through the black voltage application pulse Pb, the charging shortage is securely suppressed and the charging characteristic is further improved. As a result, comparing to the case of using the source driver according to the first configuration example, it is possible to securely prevent the horizontal irregularity from occurring in the 2H inversion drive or the like.

Note that, in the second configuration example as described above, the fixed potential (Vcom), which is equal to the potential provided to the storage capacitance line CsL, is provided to each of the data signal lines during the charge sharing period Tsh, and thereby the potential of the pixel electrode Ep forming the pixel capacitance Cp becomes equal to that of the source line SLi, which is to transfer the data signal S(i) for charging the pixel capacitance Cp at the start timing of the charge up of the pixel capacitance Cp for the pixel data writing. Thereby, the charging condition can be made the same regardless of whether the polarity of the data signal for charging the pixel capacitance is positive or negative. As a result, it is possible to accurately suppress the horizontal irregularity occurrence in the case of the nH dot line inversion drive (n≧2). Note that, for the above fixed potential, the source center potential VSdc may be used instead of the common potential Vcom, as in a third configuration to be described below.

Figure 13:
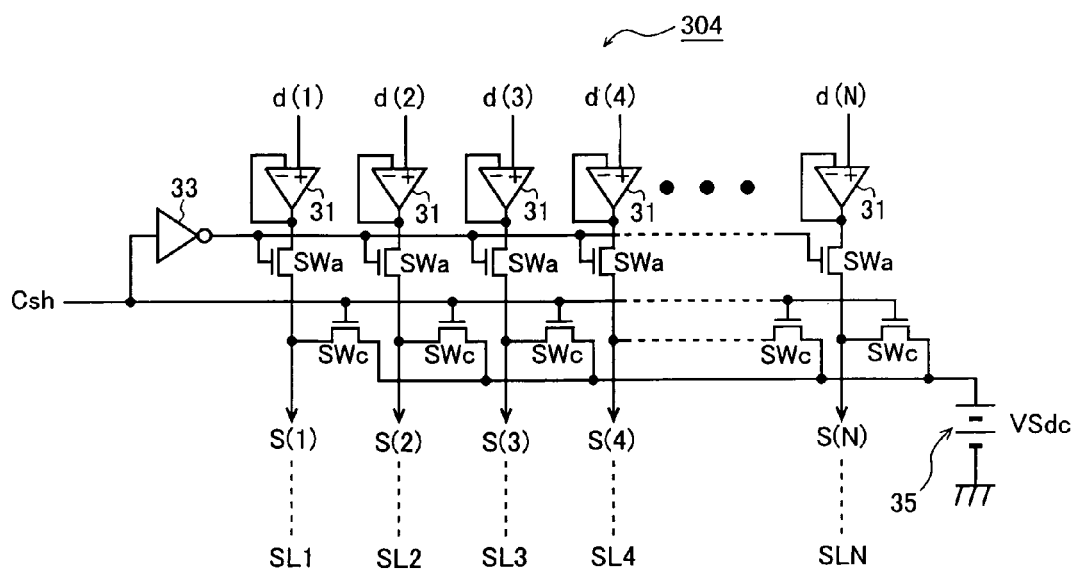
FIG. 13 is a circuit diagram showing a third configuration example of the output section of the above source driver.

FIG. 13 is a circuit diagram showing the third configuration example of the output section 304 in the source driver 300. The output section 304 of this third configuration example, as in the second configuration example, includes N first MOS transistors SWa, N second MOS transistors SWc, and an inverter 33. However, this output section 304 is provided with a charge sharing voltage fixing power supply 35 (hereinafter, simply called "fixed power supply") supplying the source center potential VSdc, instead of the common potential input terminal, and each of the output terminals is connected to the fixed power supply 35 via any one of the N second MOS transistors SWc. Other configuration is the same as that of the second configuration example.

In the third configuration example as described above, according to the charge sharing control signal Csh, the analog voltage signals d(1) to d(N), which are generated in the data signal generation section 302, are outputted and applied to the source lines SL1 to SLN, respectively, as the respective data signals S(1) to S(N) via the buffer 31 during the (effective scanning) period except for the charge sharing period Tsh, and the application of the data signals S(1) to S(N) to the respective source lines SL1 to SLN is cut off and also all the source lines SL1 to SLN are connected to the fixed power supply 35 during the charge sharing period Tsh. Therefore, in the charge sharing period Tsh, by the charge sharing operation of shorting the source lines SL1 to SLN with each other and by the supply of the source center potential VSdc from the fixed power supply 35, the potential of each of the source lines SLi becomes the source center potential VSdc. Thereby, by using the source driver of the third configuration example, the potential of each of the source lines SLi always becomes the source center potential VSdc in each of the charge sharing periods Tsh without depending on the display gradation, and, additionally by the pixel capacitance discharge through the black voltage application pulse Pb, the charging shortage is securely suppressed and the charging characteristic is further improved. As a result, comparing to the case of using the source driver according to the first configuration example, it is possible to securely prevent the horizontal irregularity from occurring in the 2H inversion drive or the like.

2. Second Embodiment

Next, another example of the liquid crystal display device using the active matrix substrate according to the present invention will be described as a second embodiment. The liquid crystal display device according to the present embodiment has the same configuration as that of the above first embodiment, except for a point that the charge sharing control signal Csh generated in the display control circuit is different, and the same or corresponding part is denoted by the same reference symbol and detailed description thereof will be omitted. Note that, hereinafter, the output section 304 of the source driver 300 is configured as shown in FIG. 12 (second configuration example), and each of the source lines SLi (i=1, 2, . . . , N) is provided with the common potential Vcom when the charge sharing control signal Csh exhibits the H level, that is, during the charge sharing period Tsh.

Figure 14:
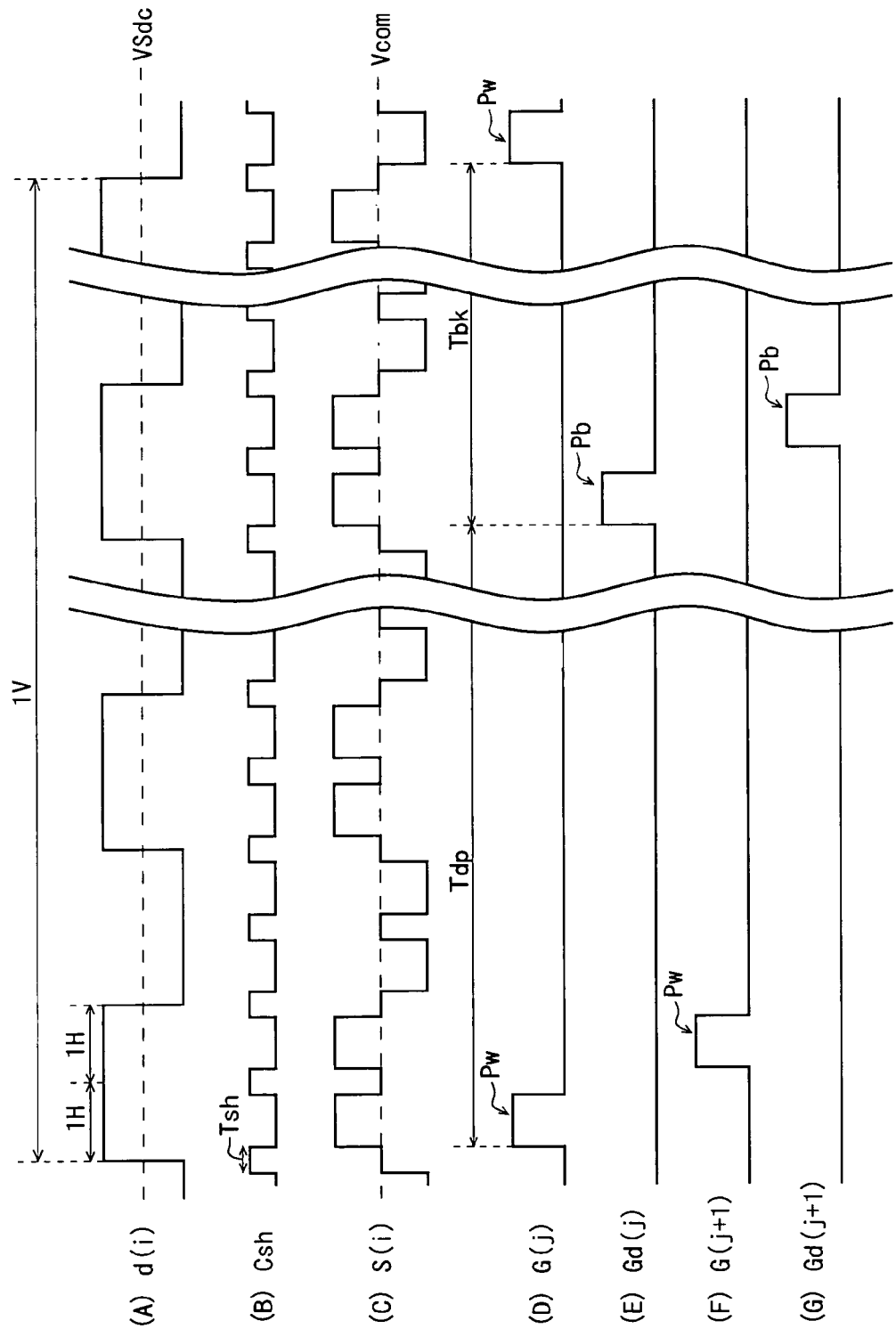
FIG. 14 consists of signal waveform charts (A) to (G) for explaining the operation of a liquid crystal display device according to a second embodiment of the present invention.

FIG. 14 is a signal waveform chart for illustrating the operation of the liquid crystal display device according to the present embodiment. This liquid crystal display device also employs the 2H dot inversion drive method as in the first embodiment, and the data signal generation section 302 in the source driver 300 generates the analog voltage signals d(1) to d(N) as shown in (A) of FIG. 14 as a video signal. These analog voltage signals d(1) to d(N) are provided to the output section 304 of the source driver 300 (refer to FIG. 7).

The display control circuit 200 of the present embodiment generates a signal as shown in (B) of FIG. 14 as the charge sharing control signal Csh. This charge sharing control signal Csh exhibits the H level during a period corresponding to the horizontal blanking period of the image display every one horizontal period, and, in this point, is different from the charge sharing control signal Csh of the first embodiment, which exhibits the H level only when the polarity of the analog voltage signal d(i) or the data signal S(i) is inverted ((B) of FIG. 9).

The output section 304 of the source driver 300 is configured as shown in FIG. 12, and thereby generates the data signals S(1) to S(N) as shown in (C) of FIG. 14 from the above analog voltage signals d(1) to d(N), respectively, and applies these data signals S(1) to S(N) to the source lines SL1 to SLN, respectively, according to such a charge sharing control signal Csh. In this manner, the present embodiment provides the charge sharing period Tsh every one horizontal period and shorts the respective source lines SLi with each other and also provides the common potential Vcom to each of the source lines SLi during the charge sharing period Tsh (i=1, 2, ..., N). Note that, in the period except for the charge sharing period Tsh, the above analog voltage signals d(1) to d(N) are applied to the source lines SL1 to SLN as the data signals S(1) to S(N), respectively.

The pixel gate driver 410, as in the first embodiment, generates the pixel scanning signals G(1) to G(M) as shown in (D) and (F) of FIG. 14, and applies these pixel scanning signals G(1) to G(M) to the pixel gate lines GL(1) to GL(M), respectively. The discharge gate driver 420, also as in the first embodiment, generates the discharge scanning signals Gd(1) to Gd(M) as shown in (E) and (G) of FIG. 14, and applies these discharge scanning signals Gd(1) to Gd(M) to the discharge gate lines GdL(1) to GdL(M), respectively.

By the above operation of the liquid crystal display device, as in the first embodiment, the black display period is inserted every display line and thereby the impulse type display is realized while suppressing the complication of the drive circuit, etc. and the increase in the operating frequency, resulting in the suppression of the tail-dragging residual image in the moving image and the improvement of the display quality in the moving image. In addition, this embodiment further improves the charging characteristic of the pixel capacitance Cp by the operation of the output section 304 in the source driver 300 according to the charge sharing control signal Csh. This will be described below in detail.

Figure 15:
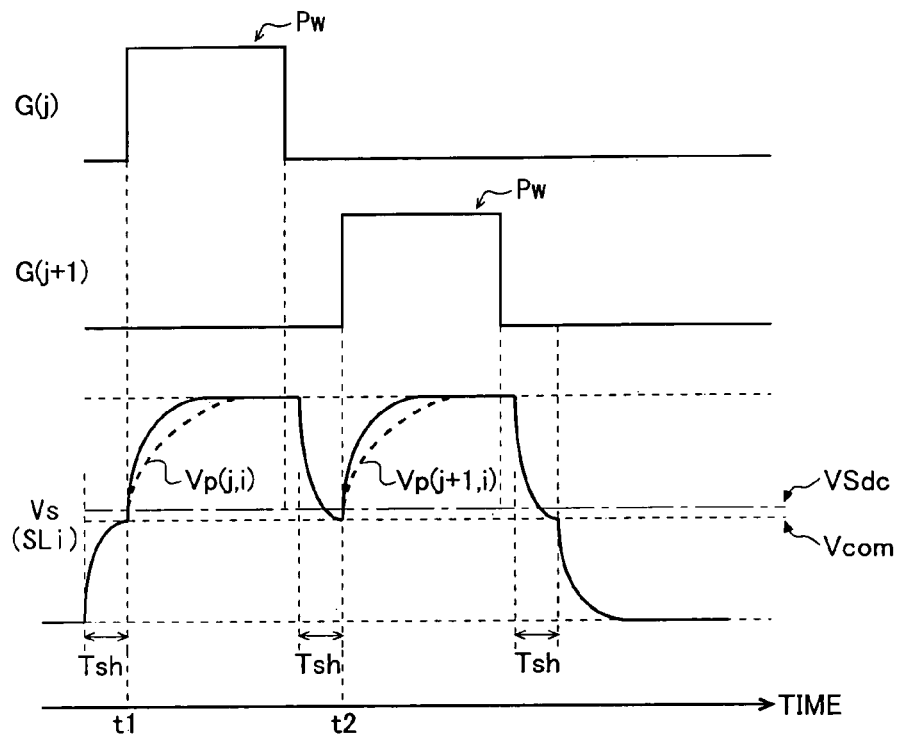
FIG. 15 is a detailed signal waveform chart for explaining the operation of the active matrix substrate in the second embodiment.
Figure 16:
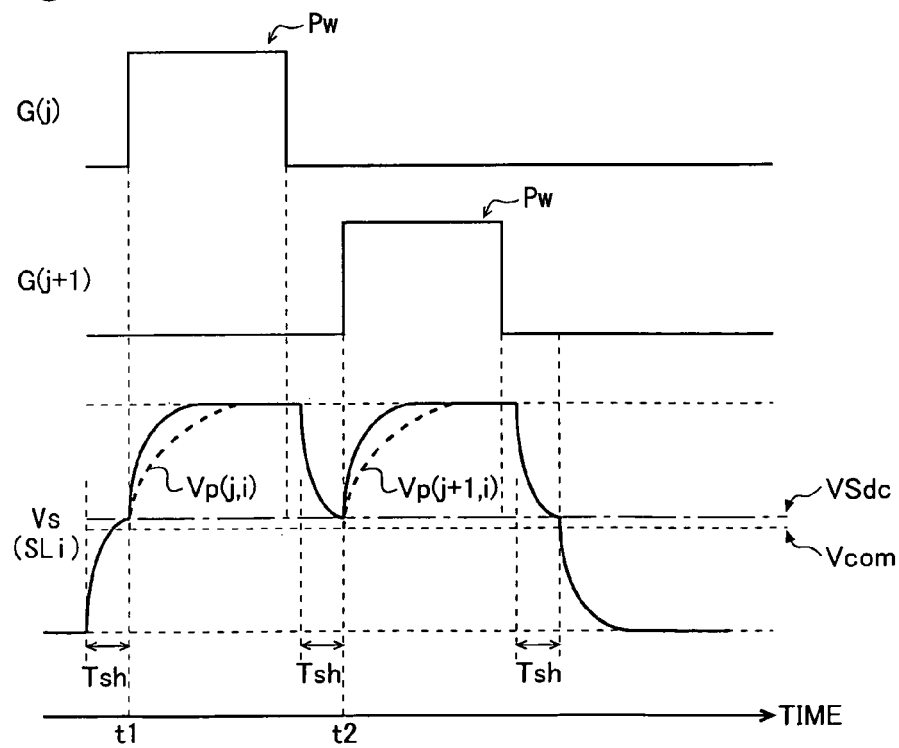
FIG. 16 is a detailed signal waveform chart for explaining the operation of an active matrix substrate in a variation of the second embodiment.

FIG. 15 a detailed signal waveform chart showing the operation of the active matrix substrate in the liquid crystal display device according to the present embodiment. As shown in FIG. 15, in the present embodiment, the charge sharing period Tsh is provided every one horizontal period, and the potential of each of the source lines SLi becomes the common potential Vcom at the end timing of the charge sharing period Tsh. Further, as in the first embodiment, each of the pixel capacitances Cp discharges by the black voltage application pulse Pb before the charging is started by the pixel data write pulse Pw, and thereby the potential Vp of the pixel electrode Ep also becomes the common potential Vcom. In this manner, for the pixel capacitance Cp in the first line and the pixel capacitance Cp in the second line, of the two lines as the unit of polarity inversion in the 2H inversion drive, at the charging start timings thereof t1 and t2, both of the potentials of the source line SLi become the common potential Vcom, and both of the potentials Vp(i, j) and Vp(j+1, i) of the pixel electrode Ep become the common potential Vcom. Accordingly, the charging shortage of the pixel capacitance Cp is further suppressed. In addition, the condition (source line potential and pixel electrode potential) at the charging start timing of the pixel capacitance Cp is the same between the first line and the second line, and thereby the difference in the charge amount between the pixel capacitance in the first line of the two lines and the pixel capacitance in the second line thereof is securely eliminated. Further, as described above, the black display period Tbk is inserted for each of the display lines by the discharge of the pixel capacitance Cp through the black voltage application pulse Pb, and thereby the impulse type display is realized while suppressing the complication of the drive circuit, etc. and the increase in the operating frequency. In this manner, the present embodiment can improve the display quality of the moving image by realizing the impulse type display while suppressing the complication of the drive circuit, etc. and the increase in the operating frequency, and can realize a higher display quality by further improving the charging characteristic of the pixel capacitance, in the active matrix-type liquid crystal display device which is the hold type display device.

while the above second embodiment provides the common potential Vcom to each of the source lines SLi during the charge sharing period Tsh using the configuration of the output section 304 in the source driver 300, as shown in FIG. 12, instead, each of the source lines SLi may be provided with the source center potential VSdc during the charge sharing period Tsh by use of the configuration of the output section 304 as shown in FIG. 13. In this case, the potential Vs of the source line SLi and the potentials Vp(j, i) and Vp(j+1, i) of the pixel electrode Ep in the active matrix substrate 110 change as shown in FIG. 16 when the pixel capacitance is charged.

That is, for the pixel capacitance Cp in the first line and the pixel capacitance Cp in the second line, of the two lines as the unit of polarity inversion in the 2H inversion drive, at the charging start timings thereof t1 and t2, both of the potentials in the source line SLi become the source center potential VSdc which is the fixed potential, and both of the potentials Vp(j, i) and Vp(j+1, i) of the pixel electrode Ep become the common potential Vcom. Accordingly, between the charging start timings t1 and t2, the potential of the source line SLi and the potential of the pixel electrode Ep are slightly different but approximately the same potential, and the condition (source line potential and pixel electrode potential) at the charging start timing of the pixel capacitance Cp is the same between the first line and the second line. Accordingly, also in the case of the above configuration of the output section 304 in the source driver 300 as shown in FIG. 12, it is possible to obtain the same advantage as in the above second embodiment.

Further, in the above second embodiment, the output section 304 of the source driver 300 may have the configuration shown in FIG. 8 (first configuration example) as in the first embodiment. In terms of improving the charging characteristic (suppressing the charging shortage and homogenizing the charging condition), the configuration shown in FIG. 12 or FIG. 13 is more preferable than this configuration, but the above second embodiment, also when employing this: configuration, provides an advantage that the charging condition is homogenized and the horizontal irregularity is prevented from occurring, compared to the above first embodiment.

3. Other Embodiments and Variations

Figure 17:
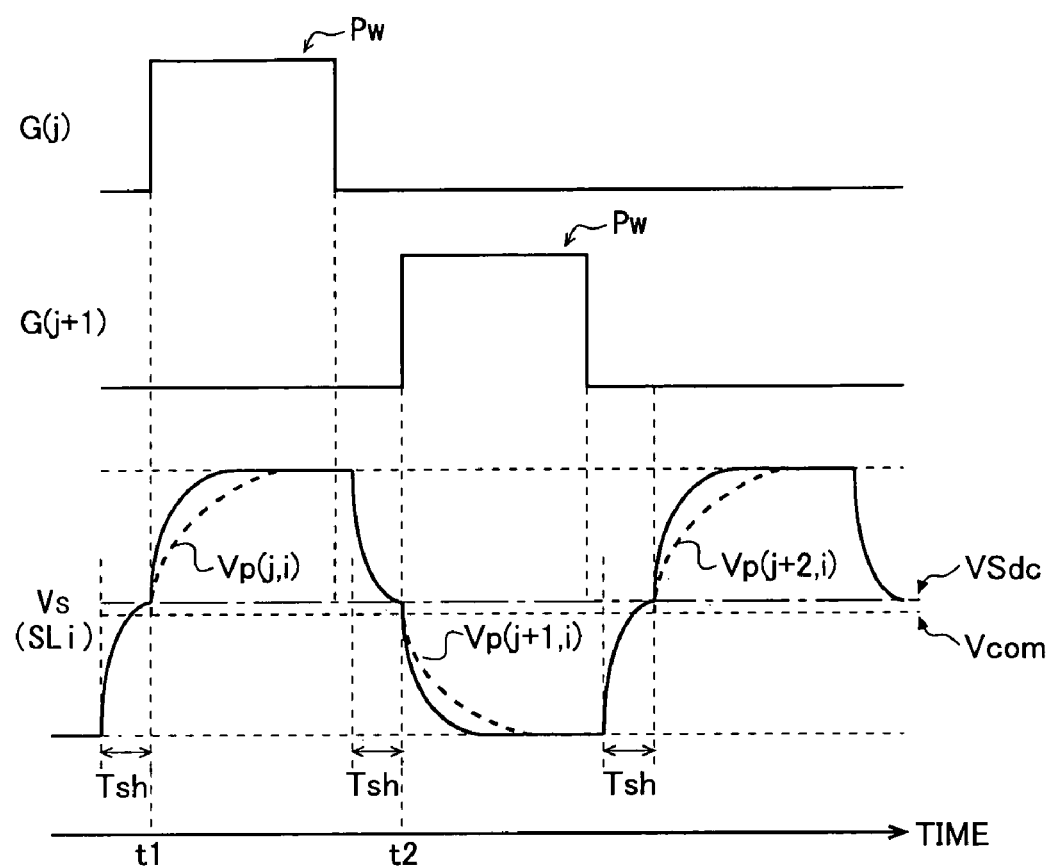
FIG. 17 is a detailed signal waveform chart for explaining the operation of an active matrix substrate in another embodiment of the present invention.

While the above first and second embodiments employ the 2H dot inversion drive method, the active matrix substrate according to the present invention can be used in the liquid crystal display device employing the 1H dot inversion drive method, and also can be used in the liquid crystal display device not employing the dot inversion drive method but employing a line inversion drive method. For example, when the active matrix substrate according to the present invention is employed in the liquid crystal display device employing the 1H dot inversion method, the potential Vs of the source line SLi and the potentials Vp(j, i) and Vp(j+1, i) of the pixel electrode Ep in the active matrix substrate change as shown in FIG. 17 when the pixel capacitance Cp is charged. Here, in the example shown in FIG. 17, each of the source lines SLi is provided with the source center potential VSdc as a fixed potential during the charge sharing period Tsh.

In this case, at the charging start timing of the pixel capacitance Cp in each of the lines, the potential of the source line SLi becomes uniformly the source center potential VSdc as the fixed potential, and both of the potentials Vp(j, i) and Vp(j+1, i) of the pixel electrode Ep become the common potential Vcom. Accordingly, even when one horizontal period (time to be secured for charging) becomes shorter for realizing the higher resolution or the like, the charging shortage of the pixel capacitance Cp is suppressed and the horizontal irregularity in a line shape, which is caused by the difference in the charge amount of the pixel capacitance between the different lines, is also suppressed. Thereby, it is possible to improve the display quality of the moving image by realizing the impulse type display while suppressing the complication of the drive circuit, etc. and the increase in the operating frequency, and also to realize higher display quality by improving the charging characteristic of the pixel capacitance (suppressing the charge amount difference and eliminating the charging shortage), as in the above first and second embodiments.

Figure 18:
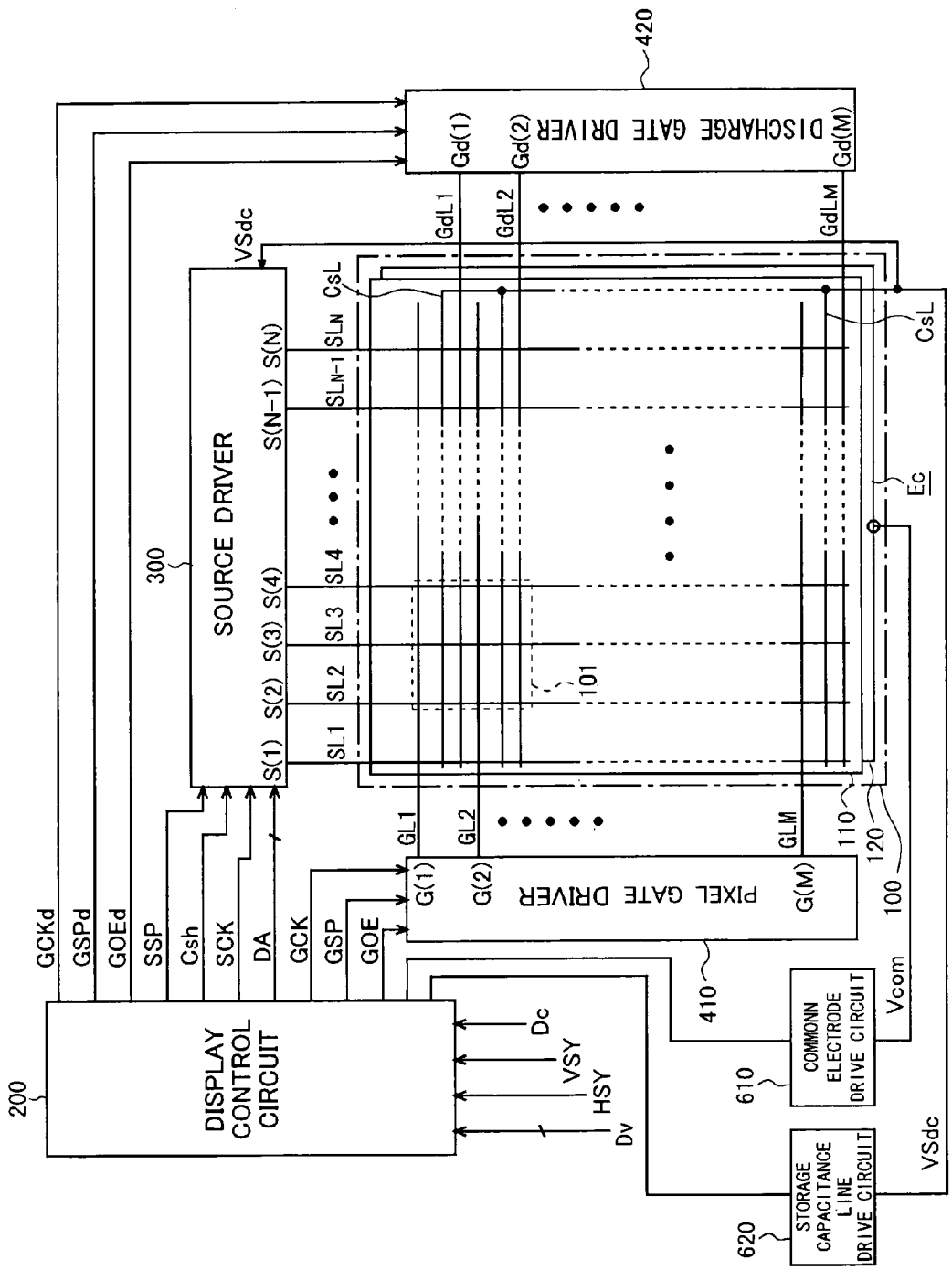
FIG. 18 is a block diagram showing a configuration of a liquid crystal display device according to another embodiment of the present invention.

Further, while the above first and second embodiments provide the common potential Vcom to the storage capacitance line CsL in the active matrix substrate 110 by the common electrode/storage capacitance line drive circuit 600 (FIG. 5), a common electrode drive circuit 610 and a storage capacitance line drive circuit 620 may be provided separately instead of the common electrode/storage capacitance line drive circuit 600 as shown in FIG. 18, and the storage capacitance line CsL may be provided with a potential other than the common potential Vcom (but, potential close to the common potential Vcom). In the example shown in FIG. 18, the storage capacitance line CsL is provided with the source center potential VSdc by the storage capacitance line drive circuit 620. Note that, in this example, the source center potential VSdc is also provided to the source driver 300, and the potential Vp of each of the source lines SLi becomes the source center potential VSdc during the charge sharing period Tsh (refer to FIG. 16). Also in such a configuration, it is possible to obtain substantially the same advantage as in the above second embodiment.

4. Application to a Television Receiver

Figure 19:
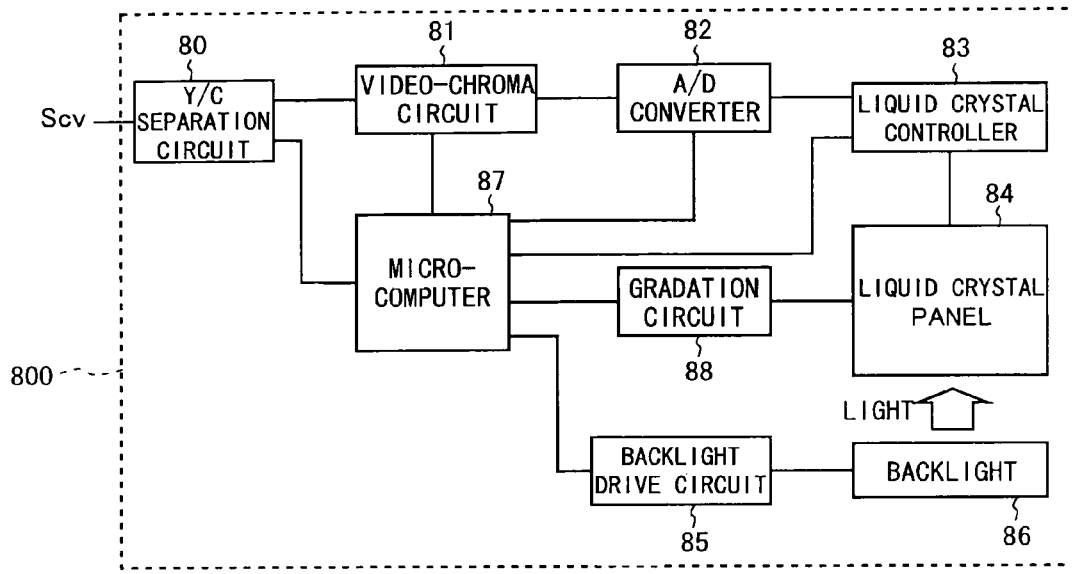
FIG. 19 is a block diagram showing a configuration example of a display device for a television receiver using the active matrix substrate according to the present invention.

Next, an example will be described for application of the active matrix substrate according to the present invention to a television receiver. FIG. 19 is a block diagram showing a configuration of a display device 800 for the television receiver. The display device 800 is provided with a Y/C separation circuit 80, a video-chroma circuit 81, an A/D converter 82, a liquid crystal controller 83, a liquid crystal panel 84, a backlight drive circuit 85, a backlight 86, a microcomputer 87, and a gradation circuit 88.

The liquid crystal panel 84 includes a display part using the active matrix substrate according to the present invention as well as a source driver, a pixel gate driver, a discharge gate driver, and a common electrode/storage capacitance line drive circuit for driving the display part, and a specific configuration thereof may be any one described in each of the embodiments or each of the variations of the present invention (refer to FIGS. 5 to 9 and FIGS. 11 to 18).

In the display device 800 with the above configuration, first a composite color video signal Scv is inputted from outside into the Y/C separation circuit 80 as a television signal and separated there into a luminance signal and color signals. These luminance signal and color signals are converted into analog RGB signals corresponding to the light's three primary colors in the video-chroma circuit 81, and further these analog RGB signals are converted into digital RGB signals in the A/D converter 82. These digital RGB signals are inputted into the liquid crystal controller 83. Further, in the Y/C separation circuit 80, horizontal and vertical synchronization signals are extracted from the composite color video signal Scv inputted from outside and these synchronization signals are also inputted into the liquid crystal controller 83 via the microcomputer 87.

To the liquid crystal panel 84, the digital RGB signals are inputted from the liquid crystal controller 83 together with timing signals based on the above synchronization signals at a predetermined timing. Further, in the gradation circuit 88, gradation voltages of each of the three primary colors R, G, and B for color display are generated and the gradation voltages are supplied also to the liquid crystal panel 84. In the liquid crystal panel 84, drive signals (data signal, pixel scanning signal, discharge scanning signal, etc.) are generated by an internal source driver, a pixel gate driver, a discharge gate driver, etc. based on these RGB signals, timing signal and gradation voltages, and a color image is displayed on an internal display part (using the active matrix substrate) based on these drive signals. Note that, for displaying the image on the liquid crystal panel 84, it is necessary to illuminate the liquid crystal panel 84 with light from the back, and in the display device 800, the backlight 86 is driven by the backlight drive circuit 85 under the control of the microcomputer 87 and thereby illuminates the back surface of the liquid crystal panel 84 with light.

Control of the entire system including the above processing is performed by the microcomputer 87. Note that, for the video signal (composite color video signal) inputted from outside, not only a video signal from television broadcasting but also a video signal obtained by shooting with a camera, a video signal supplied via the internet line, or the like can be used, and image display of the various video signals is possible in the display device 800.

Figure 20:
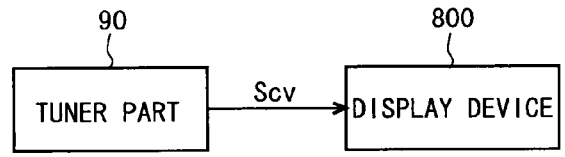
FIG. 20 is a block diagram showing an entire configuration, including a tuning section, of the television receiver using the active matrix substrate according to the present invention.

When an image of the television broadcasting is displayed on the display device 800 with the above configuration, a tuner part 90 is connected to the display device 800 as shown in FIG. 20. The tuner part 90 extracts a channel signal to be received from receiving waves (high frequency wave signal) received by an antenna (not shown in the drawing), converts the channel signal into an intermediate frequency signal, and takes out the composite color video signal Scv as a television signal by subjecting the intermediate frequency signal to detection. The composite color video signal Scv is inputted into the display device 800 as described above and an image according to the composite color video signal Scv is displayed on the display device 800.

Figure 21:
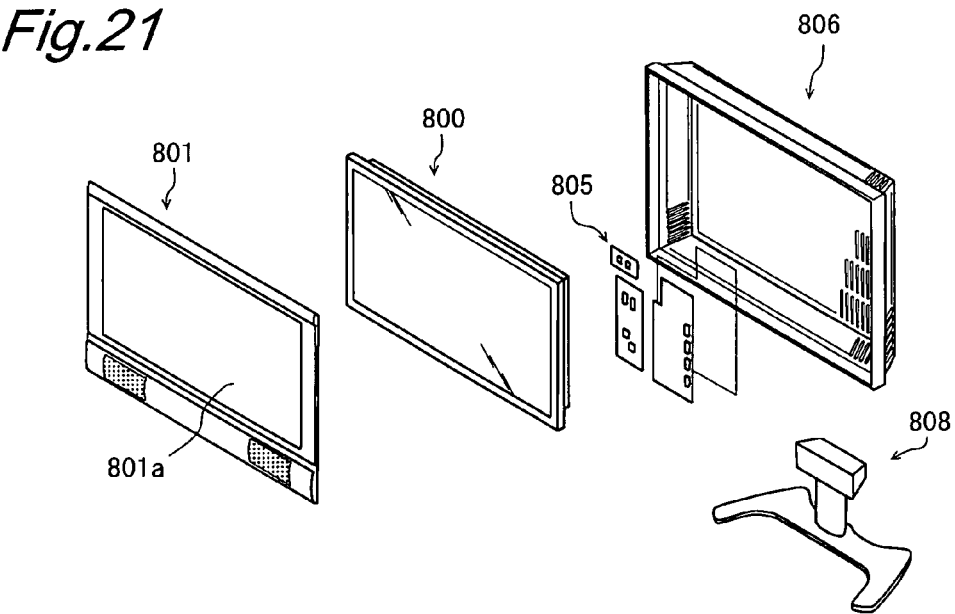
FIG. 21 is a perspective exploded view showing a mechanical configuration of the television receiver.
Figure 22:
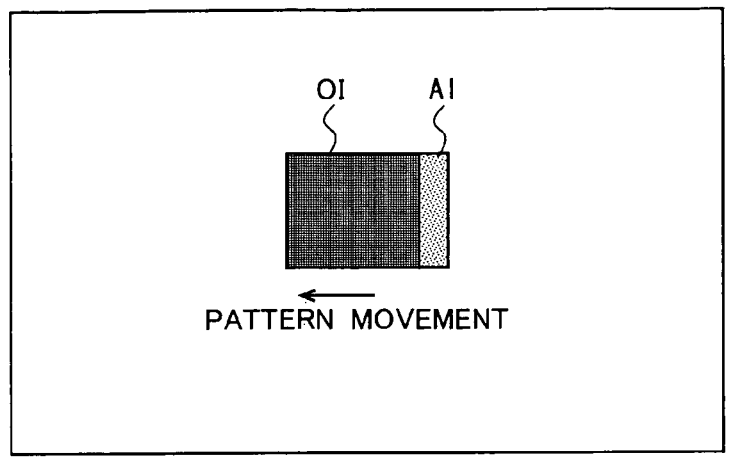
FIG. 22 is a diagram for explaining a problem in moving image display in a hold type display device.
Figure 23:
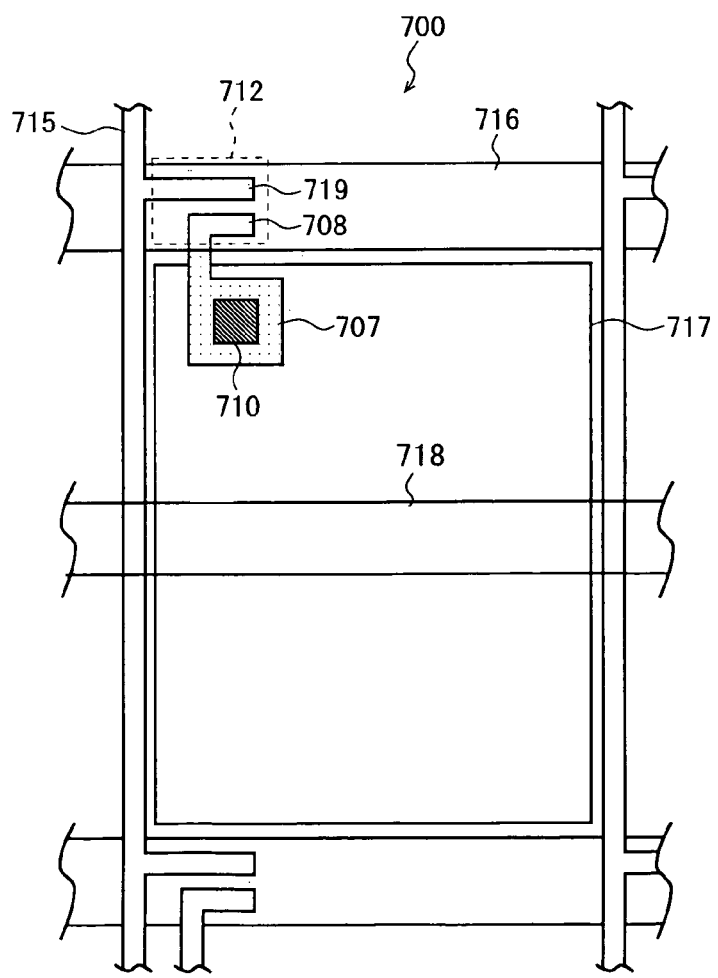
FIG. 23 is a partial plan view showing a pattern configuration of a conventional active matrix substrate.

FIG. 21 is a perspective exploded view showing an example of a mechanical configuration when the display device with the above configuration is applied to the television receiver. In the example shown in FIG. 21, the television receiver includes a first chassis 801 and a second chassis 806 in addition to the above display device 800 as constituents thereof, and is configured such that the first chassis 801 and the second chassis 806 sandwich the display device 800 so as to wrap the same. The first chassis 801 has an opening 801a formed for transmitting an image displayed on the display device 800. Further, the second chassis 806 is one to cover the back side of the display device 800 and provided with an operation circuit 805 for operating the display device 800 and also a supporting member 808 attached on the lower side.

In the television receiver as described above, the active matrix substrate, source driver, pixel gate driver, discharge gate driver, etc. in the liquid crystal panel 84 have the same configurations as those of the foregoing first or second embodiments or the variations thereof, and thereby it is possible to improve the display quality of the moving image by realizing the impulse type display while suppressing the complication of the drive circuit, etc. and the increase in the operating frequency in the display device, and also to realize a higher display quality by improving the charging characteristic of the pixel capacitance.

INDUSTRIAL APPLICABILITY

The present invention is applied to the active matrix substrate or the display device provided with the same, and is particularly suitable for the active matrix-type liquid crystal display device and the active matrix substrate used for the same.

The invention claimed is:

1. An active matrix substrate, comprising:
a plurality of data signal lines;
a plurality of pixel scanning signal lines intersecting the plurality of data signal lines;
a pixel switching element provided corresponding to each of intersections of the plurality of data signal lines and the plurality of pixel scanning signal lines, and turned on and off by the pixel scanning signal line passing through the corresponding intersection;
a pixel electrode connected to the data signal line passing through the intersection corresponding to the pixel switching element via the pixel switching element;
a storage capacitance line disposed so as to form a predetermined capacitance with each of the pixel electrodes;
a plurality of discharge scanning signal lines corresponding to the plurality of pixel scanning signal lines, respectively; and
a discharge switching element provided corresponding to each of the pixel electrodes, and turned on and off by the discharge scanning signal line which corresponds to the pixel scanning signal line for turning on and off the pixel switching element connected to the corresponding pixel electrode,
each of the pixel electrodes being connected to the storage capacitance line via the corresponding discharge switching element.

2. The active matrix substrate according to claim 1, wherein;
the storage capacitance line has an extended portion extending in a direction along the data signal line; and
the discharge switching element is a thin film transistor having a drain electrode and a source electrode, the drain electrode being connected to the pixel electrode corresponding to the discharge switching element, and the source electrode being connected to the extended portion via a predetermined source extraction electrode.

3. The active matrix substrate according to claim 2, wherein the extended portion and the source extraction electrode form a structure disposed circularly along an edge of the pixel electrode.

4. The active matrix substrate according to claim 2, wherein an electrode connected to the source and an electrode connected to the drain of the thin film transistor as the discharge switching element are formed of the same material as that of the data signal line.

5. The active matrix substrate according to claim 1, wherein the storage capacitance line has a circular portion including a portion which extends in parallel to the data signal line along an edge of the pixel electrode and a portion which extends in parallel to the pixel scanning signal line along the edge of the pixel electrode.

6. The active matrix substrate according to claim 1, wherein the discharge switching element is disposed so as to overlap an electrode pattern forming the discharge scanning signal line.

7. The active matrix substrate according to claim 1, wherein the pixel electrode is disposed so as to overlap the discharge scanning signal line.

8. A normally black mode display device, comprising;
an active matrix substrate according to claim 1;
a common electrode disposed so as to face each of pixel electrodes in the active matrix substrate;
a pixel scanning signal line drive circuit for selectively applying an active signal, which turns on the pixel switching element, to the plurality of pixel scanning signal lines and causing the pixel scanning signal line to which the active signal is applied to be in a selected state such that each of the plurality of pixel scanning signal lines is in the selected state at least once during each frame period;
a discharge scanning signal line drive circuit for selectively applying an active signal, which turns on the discharge switching element, to the plurality of discharge scanning signal lines and causing the discharge scanning signal line to which the active signal is applied to be in a selected state such that each of the plurality of discharge scanning signal lines is in the selected state during a predetermined period within a period from a first time point when the corresponding pixel scanning signal line changes from the selected state to a non-selected state to a second time point when the corresponding pixel scanning signal line is in the selected state in the next frame period;
a data signal line drive circuit for generating a plurality of data signals to display an image as voltage signals whose polarities are inverted every predetermined number of horizontal periods, and applying the plurality of data signals to the plurality of data signal lines, respectively;
a common potential supply section for providing a predetermined common potential to the common electrode; and
a storage capacitance line potential supply section for providing a predetermined potential approximately the same as the common potential to the storage capacitance line.

9. The display device according to claim 8, wherein the data signal line drive circuit generates the plurality of data signals so as to invert the voltage polarity thereof every two or more predetermined number of horizontal periods.

10. The display device according to claim 8, wherein the data signal line drive circuit
   generates the plurality of data signals so as to invert the polarity thereof every predetermined number of the data signal lines, and
   cuts off the application of the plurality of data signals to the respective plurality of data signal lines and also shorts the plurality of data signal lines with each other, during a predetermined period when the polarities of the plurality of data signals are inverted.

11. The display device according to claim 10, wherein the data signal line drive circuit cuts off the application of the plurality of data signals to the respective plurality of data signal lines and also shorts the plurality of data signal lines with each other, during a predetermined period every one horizontal period.

12. The display device according to claim 11, wherein the data signal line drive circuit provides a predetermined fixed potential to the plurality of data signal lines when the plurality of data signal lines are shorted with each other.

13. The display device according to claim 12, wherein the fixed potential is equal to the predetermined potential.

14. The display device according to claim 12, wherein the storage capacitance line potential supply section provides the common potential to the storage capacitance line as the predetermined potential.

15. The display device according to claim 12, wherein the fixed potential is a potential corresponding to a center value between a minimum value and a maximum value of the data signal.

16. The display device according to claim 11, wherein the storage capacitance line potential supply section provides the potential corresponding to a center value between a minimum value and a maximum value of the data signal to the storage capacitance line as the predetermined potential.

17. A television receiver, comprising a display device according to claim 8.

18. A drive method of a normally black mode display device provided with an active matrix substrate and a common electrode; the active matrix substrate including a plurality of data signal lines, a plurality of pixel scanning signal lines intersecting the plurality of data signal lines, a pixel switching element which is provided corresponding to each of intersections of the plurality of data signal lines and the plurality of pixel scanning signal lines and turned on and off by the pixel scanning signal line passing through the corresponding intersection, a pixel electrode connected to the data signal line passing through the intersection corresponding to the pixel switching element via the pixel switching element, and a storage capacitance line disposed so as to form a predetermined capacitance with the pixel electrode; the common electrode being disposed so as to face each of the pixel electrodes in the active matrix substrate; the drive method comprising:
   a pixel scanning signal line drive step of selectively applying an active signal, which turns on the pixel switching element, to the plurality of pixel scanning signal lines and causing the pixel scanning signal line to which the active signal is applied to be in a selected state such that each of the plurality of pixel scanning signal lines is in the selected state at least once during each frame period;
   a data signal line drive step of generating a plurality of data signals to display an image as voltage signals whose polarities are inverted every predetermined number of horizontal periods and applying the plurality of data signals to the plurality of data signal lines, respectively;
   a common potential supply step of providing a predetermined common potential to the common electrode;
   a storage capacitance line potential supply step of providing a predetermined potential approximately equal to the common potential to the storage capacitance line; and
   a discharge step of shorting each of the pixel electrodes to the storage capacitance line, wherein
   the active matrix substrate further includes:
      a plurality of discharge scanning signal lines corresponding to the plurality of pixel scanning signal lines, respectively; and
      a discharge switching element provided corresponding to each of the pixel electrodes, and turned on and off by the discharge scanning signal line which corresponds to the pixel scanning signal line for turning on and off the pixel switching element connected to the corresponding pixel electrode,
   each of the pixel electrodes is connected to the storage capacitance line via the corresponding discharge switching element, and
   in the discharge step, an active signal, which turns on the discharge switching element, is selectively applied to the plurality of discharge scanning signal lines and the discharge scanning signal line to which the active signal is applied is caused to be in a selected state, such that each of the plurality of discharge scanning signal lines is in the selected state during a predetermined period within a period from a first time point when the corresponding pixel scanning signal line changes from the selected state to a non-selected state to a second time point when the corresponding pixel scanning signal line is in the selected state in the next frame period.

19. The drive method according to claim 18, wherein in the data signal line drive step the plurality of data signals are generated so as to invert voltage polarity thereof every two or more predetermined number of horizontal periods.

20. The drive method according to claim 18, wherein, in the data signal line drive step,
   the plurality of data signals are generated so as to invert the polarity thereof every predetermined number of data signal lines, and
   the application of the plurality of data signals to the respective plurality of data signal lines is cut off and the plurality of data signal lines are also shorted with each other during a predetermined period when the polarities of the plurality of data signals are inverted.

21. The drive method according to claim 20, wherein, in the data signal line drive step, the application of the plurality of data signals to the respective plurality of data signal lines is cut off and the plurality of data signal lines are also shorted with each other during a predetermined period every one horizontal period.

* * * * *